(12) United States Patent
Vollmer et al.

(10) Patent No.: US 12,438,267 B2
(45) Date of Patent: Oct. 7, 2025

(54) MOBILE COMMUNICATION ANTENNA

(71) Applicant: Telefonaktiebolaget LM Ericsson (publ), Stockholm (SE)

(72) Inventors: Andreas Vollmer, Rosenheim (DE); Maximilian Obermayer, Rosenheim (DE); Martin Güllner, Stephanskirchen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 143 days.

(21) Appl. No.: 18/282,264

(22) PCT Filed: Mar. 30, 2021

(86) PCT No.: PCT/EP2021/058280
§ 371 (c)(1),
(2) Date: Sep. 15, 2023

(87) PCT Pub. No.: WO2022/207077
PCT Pub. Date: Oct. 6, 2022

(65) Prior Publication Data
US 2024/0162627 A1    May 16, 2024

(51) Int. Cl.
*H01Q 1/52* (2006.01)
*H01Q 1/24* (2006.01)
(Continued)

(52) U.S. Cl.
CPC ............. *H01Q 1/523* (2013.01); *H01Q 1/246* (2013.01); *H01Q 1/526* (2013.01); *H01Q 9/26* (2013.01);
(Continued)

(58) Field of Classification Search
CPC .......... H01Q 1/246; H01Q 1/52; H01Q 1/521; H01Q 1/523; H01Q 1/525; H01Q 1/526;
(Continued)

(56) References Cited

U.S. PATENT DOCUMENTS

| | | |
|---|---|---|
| 8,115,696 B2 | 2/2012 | Skalina et al. |
| 9,590,317 B2 | 3/2017 | Zimmerman et al. |
| 10,553,958 B2 | 2/2020 | Xiao et al. |

FOREIGN PATENT DOCUMENTS

| | | |
|---|---|---|
| CN | 110783666 A | 2/2020 |
| CN | 108432051 B | 9/2020 |

(Continued)

OTHER PUBLICATIONS

Author Unknown, "Huawei Antenna Products Catalogue," 2020, Huawei Technologies Co., Ltd., p. 6.
(Continued)

*Primary Examiner* — Robert Karacsony
(74) *Attorney, Agent, or Firm* — Withrow & Terranova, PLLC

(57) ABSTRACT

A mobile communication antenna with at least one dual-polarized radiator comprises a first metal plate arrangement with a first and second side. A first printed circuit board arrangement is provided which is arranged on the second side of the first metal plate arrangement. A first free space formed between the first printed circuit board arrangement and the first metal plate arrangement. The first metal plate arrangement comprises at least one first opening through which a first feed connection of the at least one dual-polarized radiator is passed. The first feed connection is electrically connected to a first signal line on the first printed circuit board arrangement. The first feed connection of the at least one dual-polarized radiator is surrounded by an electrically conductive first shielding in a non-contacting manner.

17 Claims, 16 Drawing Sheets

(51) Int. Cl.
  *H01Q 9/26* (2006.01)
  *H01Q 19/10* (2006.01)
  *H01Q 21/00* (2006.01)
  *H01Q 21/06* (2006.01)
  *H01Q 21/26* (2006.01)

(52) U.S. Cl.
  CPC ....... *H01Q 19/108* (2013.01); *H01Q 21/0081* (2013.01); *H01Q 21/062* (2013.01); *H01Q 21/26* (2013.01)

(58) Field of Classification Search
  CPC .. H01Q 5/40; H01Q 5/42; H01Q 5/48; H01Q 21/0006; H01Q 21/0075; H01Q 21/0081; H01Q 21/06; H01Q 21/061; H01Q 21/062; H01Q 21/24; H01Q 21/26; H01Q 21/28; H01Q 25/001
  See application file for complete search history.

(56) References Cited

FOREIGN PATENT DOCUMENTS

| | | | |
|---|---|---|---|
| EP | 1772929 | A1 | 4/2007 |
| EP | 3244483 | A1 * | 11/2017 |
| EP | 3361567 | A1 | 8/2018 |
| EP | 3389139 | A1 | 10/2018 |
| GB | 2333400 | A | 7/1999 |
| WO | 2011026034 | A2 | 3/2011 |
| WO | 2018224666 | A1 | 12/2018 |
| WO | 2020135506 | A1 | 7/2020 |

OTHER PUBLICATIONS

Author Unknown, "Collar Pulling," Document DIN 8584-5, www2.htw-dresden.de/~manufact/home/uzt/Kragenziehen/index.html, accessed on Oct. 30, 2023, University of Applied Sciences Dresden, 2 pages.
Fromm, W.E., "Characteristics and Some Applications of Stripline Components," Airborne Instruments Laboratory, Inc., Mineola, New York, 1955, pp. 13-20.
International Search Report and Written Opinion for International Patent Application No. PCT/EP2021/058280, mailed Nov. 30, 2021, 11 pages.

* cited by examiner

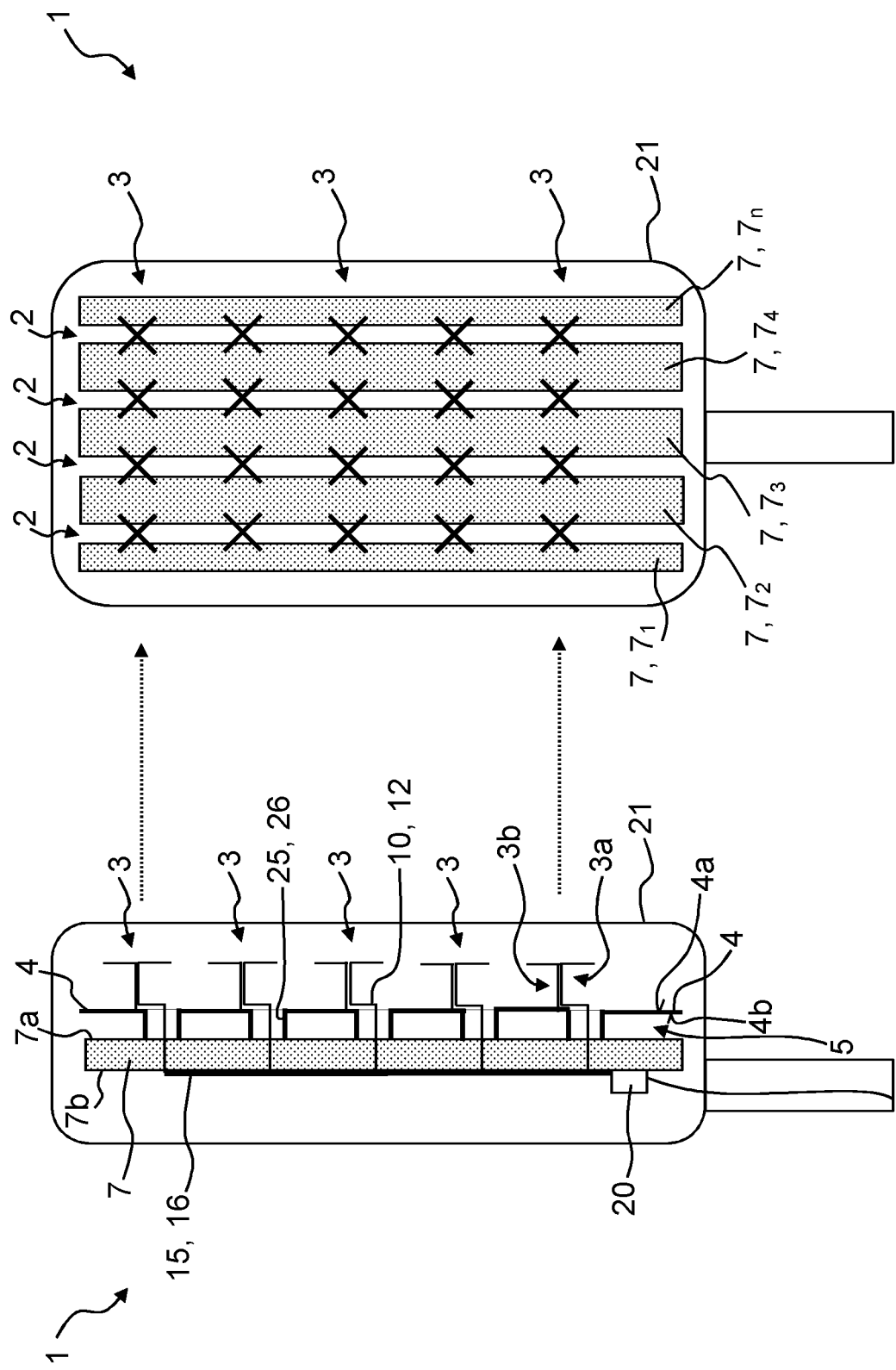

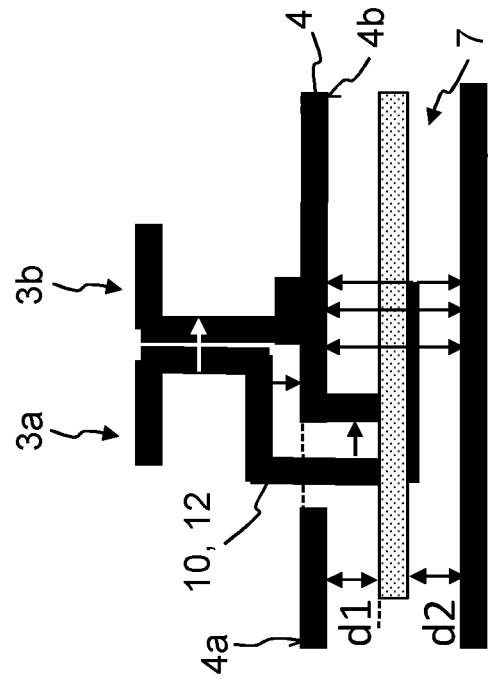
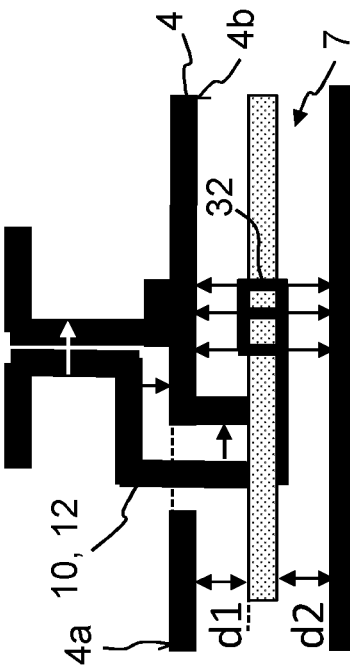
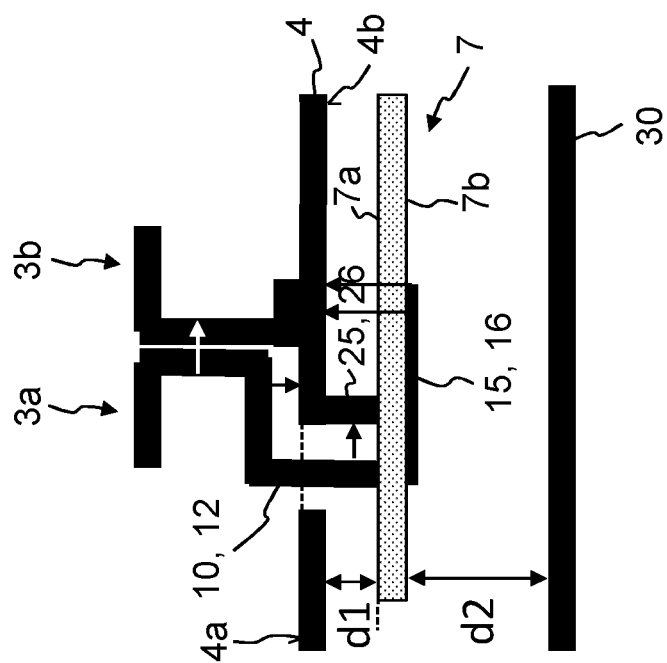
Fig. 2B
Fig. 2C
Fig. 2A

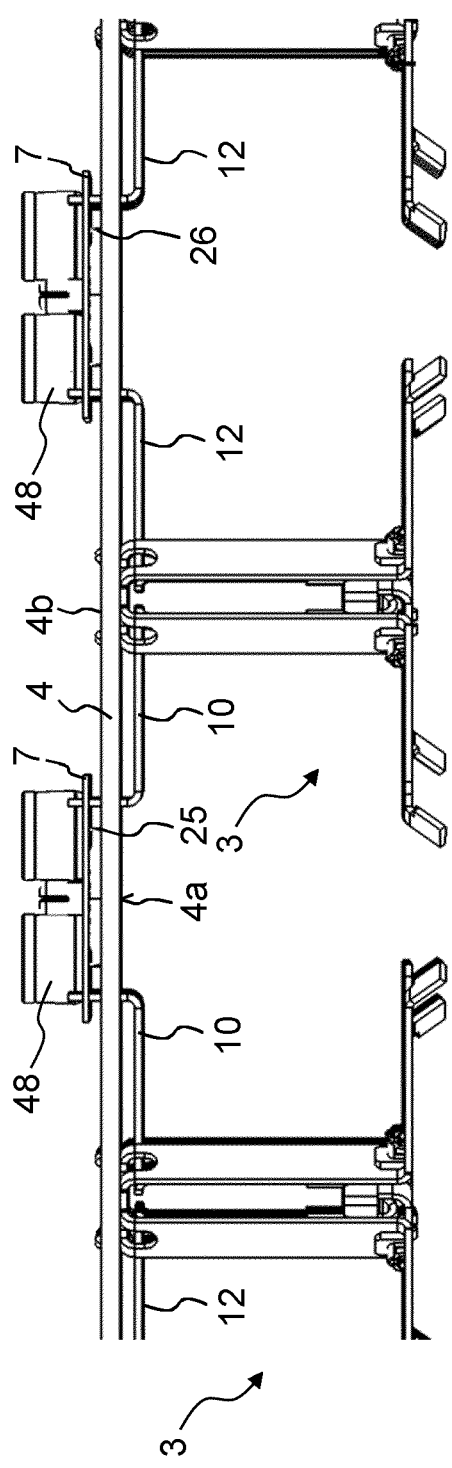
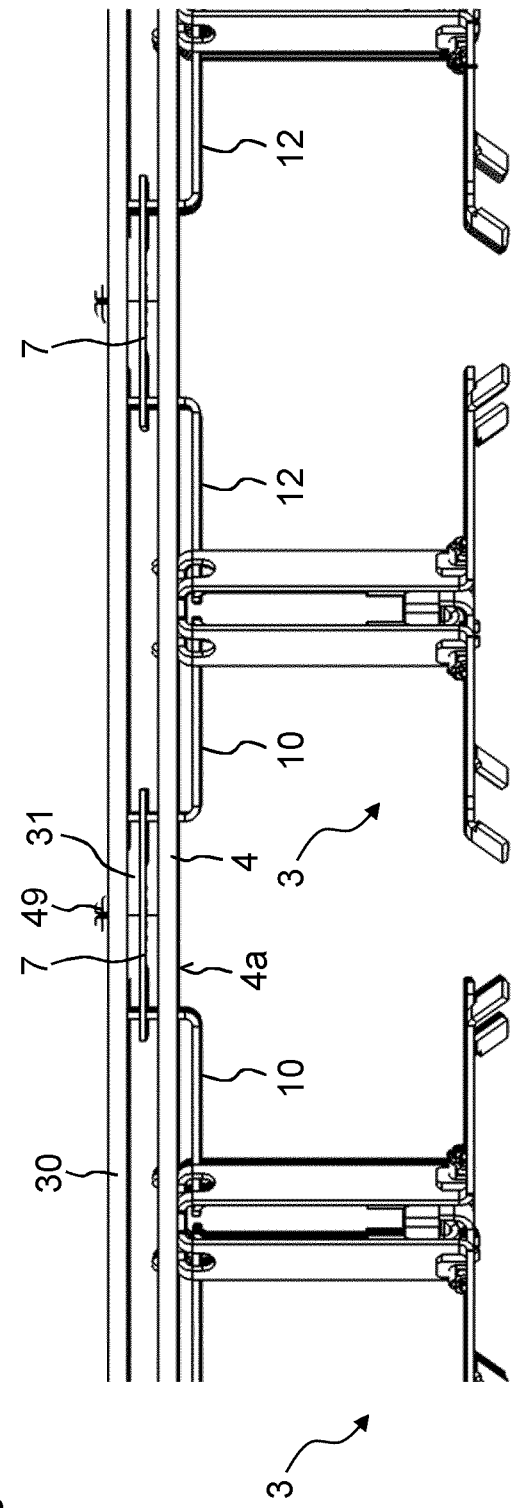
Fig. 8A
Fig. 8B

MOBILE COMMUNICATION ANTENNA

This application is a 35 U.S.C. § 371 national phase filing of International Application No. PCT/EP2021/058280, filed Mar. 30, 2021, the disclosure of which is incorporated herein by reference in its entirety.

TECHNICAL FIELD

The invention relates to a mobile communication antenna which is preferably mounted on a mast.

BACKGROUND

Mobile communication antennas are more and more packed with radiators and additional systems. As such, the effort to connect each radiator to the respective additional systems like phase shifter for example increases. This becomes more and more of a problem when thinking of massive MIMO systems having a plurality of dual-polarized radiators.

The U.S. Pat. No. 10,553,958 B2 shows a mobile communication antenna which comprises radiators that are arranged in a first side of a reflector arrangement and a housing that is arranged on a second side of the reflector arrangement. The housing is separated into various chambers which are electrically isolated from each other. Openings in the reflector arrangement allow that the radiators can be connected to other components arranged inside the housing.

However, one problem is that the connections of different radiators are all fed into the same housing and as such that the decoupling of those connections is insufficient.

SUMMARY

As such, it is the object of the present invention to create a mobile communication antenna which comprises a plurality of dual-polarized radiators, wherein the decoupling of the individual dipoles and the respective feeding networks is increased based on a simple and cost effective implementation.

The object is solved by the mobile communication antenna according to claim 1. The dependent claims describe further embodiments of the mobile communication antenna according to the present.

The mobile communication antenna comprises at least one dual-polarized radiator. The radiator could be in form of a cross dipole, vector dipole or dipole square. The mobile communication antenna comprises a first metal plate arrangement. The at least one dual-polarized radiator is disposed on a first side of the first metal plate arrangement. The first metal plate arrangement could also be called a reflector arrangement. The first metal plate arrangement could be made of a single piece or of a plurality of pieces. The first metal plate arrangement could be a sheet metal plate or it could even be made of plastic which comprises an electrically conductive surface. In addition, a first printed circuit board arrangement is provided which is arranged on a second side of the first metal plate arrangement. The first printed circuit board arrangement could be a single printed circuit board or a plurality of printed circuit boards. The printed circuit board arrangement comprises at least one dielectric layer (or more than one dielectric layer) and at least one metal layer. Furthermore, a first free space is formed between the first printed circuit board arrangement and the first metal plate arrangement. The first metal plate arrangement comprises at least one first opening through which a first feed connection for a first polarization of the at least one dual-polarized radiator is passed. The opening could be made in a stamping and/or lasering process for example. The first feed connection is electrically connected to a first signal line on the first printed circuit board arrangement. Furthermore, the first feed connection is electrically isolated from the first metal plate arrangement. The first feed connection of the at least one dual-polarized radiator is also surrounded at least over a predominant length in the first free space by an electrically conductive first shielding in a non-contacting manner. As such, an E-field is created between the first feed connection and the first shielding during operation of the mobile communication antenna. The first shielding is preferably only arranged within the first free space. Therefore, the decoupling is increased and the electrical performance is enhanced. The electrically conductive first shielding can also be used as a spacer to adjust the distance between the first metal plate arrangement and the first printed circuit board arrangement. The first printed circuit board arrangement will carry the at least one first signal line (feeding line) for the at least one dual-polarized radiator and can optionally (as described later) form a suspended microstrip line together with the first metal plate arrangement and an optional second metal plate arrangement arranged behind the first printed circuit board arrangement so that the first printed circuit board arrangement is arranged in the middle.

In another embodiment of the mobile communication antenna, the first shielding is an integral part of the first metal plate arrangement. In other words, the first shielding and the first metal plate arrangement are formed of a single piece. As such, the first shielding is formed by a forming process. Forming processes could be a bending process and/or an embossing process. Alternatively, the first shielding is an electrically conductive bushing which is inserted or pressed into the at least one first opening in the first metal plate arrangement.

Preferably, the first shielding also serves as a spacer and also rests upon the first printed circuit board arrangement.

In another embodiment of the mobile communication antenna, the first shielding is a bent and/or stamped part. Preferably, it is bent by approximately 90° relative to the (surface) of the first metal plate arrangement in the direction of the first printed circuit board arrangement. Alternatively, it is frustoconical or cone-shaped or collar-shaped. In those cases, it is ensured that the printed circuit board arrangement will not be damaged by sharp edges.

In another preferred embodiment of the mobile communication antenna, the first shielding rests on the first printed circuit board arrangement.

Preferably, the first shielding encloses the first feed connection circumferentially (by 360°). However, it could also be that the first shielding could have an opening on one side which extends over a certain length in the first free space or over the predominant length in the first free space or over the entire length in the first free space.

In another embodiment of the mobile communication antenna, the first printed circuit board arrangement comprises a first side facing the first metal plate arrangement and a second side which is opposite to the first side. The first feed connection is galvanically connected to the first signal line which runs entirely or predominantly on the second side of the first printed circuit board arrangement. Preferably, the first printed circuit board arrangement comprises an opening through which the first feed connection passes so that the first feed connection can be galvanically connected to the first signal line on the second side of the first printed circuit board arrangement. The connection could be made by an electrically conductive adhesive or by soldering.

In another preferred embodiment of the mobile communication antenna, the first printed circuit board arrangement comprises a first electrically conductive boundary structure. The first boundary structure surrounds the first signal line in the region in which it contacts the first feed connection. The first boundary structure is electrically isolated from the first signal line. However, the first boundary structure comprises an opening in the circumferential direction through which the first signal line emerges. By the use of such a first boundary structure, the bandwidth increases and the impedance of the connection can be adjusted. The first boundary structure is preferably a layer on the first printed circuit board arrangement.

In another preferred embodiment of the mobile communication antenna, the first boundary structure is annular (for example and annular ring). In addition or alternatively, the first boundary structure lies in the same plane of the first printed circuit board arrangement as the portion of the first signal line which extends through the opening of the first boundary structure. More preferably, the first boundary structure is formed by a layer of the first printed circuit board arrangement on the second side, wherein the first signal line is also formed by a layer of the first printed circuit board arrangement arranged on the second side.

In another preferred embodiment of the mobile communication antenna, the first printed circuit board arrangement comprises at least one via at the position of the first signal line where the shape, width and/or direction of the first signal line changes. Preferably, the first signal line also changes the side on the first printed circuit board arrangement. Instead of running on the second side of the first printed circuit board arrangement, the first signal line could be a run on the first side of the printed circuit board arrangement.

Preferably, the first signal line is a microstrip, a suspended microstrip, an inverted suspended microstrip or a symmetric suspended microstrip (triplate).

In another embodiment of the mobile communication antenna, a plurality of dual-polarized radiators are provided. They are arranged in plurality of columns, wherein each of the plurality of columns extends in the longitudinal direction of the mobile communication antenna. The columns are spaced apart from each other. The first metal plate arrangement comprises a plurality of first openings. A first feed connection for a first polarization of the respective dual-polarized radiator is passed through the first opening. The first metal plate arrangement also comprises a plurality of second openings. One second feed connection for a second polarization of the dual-polarized radiators is passed through the each of the respective second openings. Each dual-polarized radiator preferably comprises one first feed connection and one second feed connection. The first feed connections are galvanically connected to a respective first signal line on the first printed circuit board arrangement. The second feed connections are electrically connected to a respective second signal line on the first printed circuit board arrangement. The first feed connections are each surrounded in the first free space over a predominant length or the entire length without a contact by an electrically conducted first shielding. As such, an E-field is formed between the respective first feed connection and the respective first shielding. The second feed connections are each surrounded in the first free space over a predominant length or the entire length without any contact by an electrically conducive second shielding. As such, an E-field is formed between the respective second feed connection and the respective second shielding. A maximum of one first feed connections is passed through each of the respective first openings. A maximum of one second feed connections is passed through each of the respective second openings. The wording shielding could also be replaced by shielding structure.

In another embodiment, the electrical connection between the dual-polarized radiator and the first printed circuit board arrangement for transmitting and receiving mobile communication signals is free of any cables.

In another embodiment, the first feed connections of dual-polarized radiators of the same column might be electrically (galvanically) connected to each other on the first printed circuit board arrangement but preferably not on the first side of the first metal plate arrangement. The same could also be true for the second feed connections. The second feed connections of dual-polarized radiators of the same column could be electrically (galvanically) connected to each other on the first printed circuit board arrangement but preferably not on the first side of the first metal plate arrangement.

In another embodiment of the mobile communication antenna, the first printed circuit board arrangement comprises a plurality of sub printed circuit board arrangements which extend in the longitudinal direction of the mobile communication antenna and which are spaced apart from each other. Preferably, each sub printed circuit board arrangement is arranged close to one column. More preferably, the sub printed circuit board arrangements are spaced apart from each other in a direction perpendicular to the longitudinal direction of the mobile communication antenna. The sub printed circuit board arrangement alternately receive only first or only second feed connections of the dual-polarized radiators. The first sub printed circuit board arrangement only receives first feed connections of dual-polarized radiators of the first column. The last sub printed circuit board arrangement only receives a feed connection from the dual-polarized radiators of the last column. Sub printed circuit board arrangements which are arranged between the first and the last sub printed circuit board arrangement receive only first or only second feed connections from the dual-polarized radiators located in two adjacent columns. In other words, the first sub printed circuit board arrangement could only receive first feed connections from dual-polarized radiators arranged in the first column. The second sub printed circuit board arrangement then receives second feed connections from dual-polarized radiators arranged in the first and in the second column. The third sub printed circuit board arrangement then receives first feed connections from dual-polarized radiators arranged in the second and third column. The fourth and for example last sub printed circuit board arrangement would then receive only second feed connections from the dual-polarized radiators arranged in the last column. Each sub printed circuit board arrangement could be an individual (single) printed circuit board.

Alternatively, the first printed circuit board arrangement extends at least predominantly across all columns of the mobile communication antenna and receives both the first and the second feed connections of (all) the dual-polarized radiators in all columns.

In another preferred embodiment of the mobile communication antenna, a plurality of first and second phase shifter arrangements are arranged on the first printed circuit board arrangement. For each column, a first phase shifter arrangement is connected to the first feed connections of the respective dual-polarized radiators of the respective column. For each column, a second phase shifter arrangement is connected to the second feed connections of the respective dual-polarized radiators of the respective column. Preferably the phase shifters are electrically isolated from each other and they are more preferably arranged in individual chambers.

In another preferred embodiment of the mobile communication antenna, a second metal plate arrangement is provided. The first printed circuit board arrangement is thereby arranged between the first and the second metal plate arrangement. The second metal plate arrangement is attached (for example screwed) to the first metal plate arrangement and/or to the first printed circuit board arrangement. Spacers are preferably used so that a space is maintained between those arrangements. In that case a second free space is formed between the second metal plate arrangement and the first printed circuit board arrangement.

In another preferred embodiment of the mobile communication antenna, the spacers are elevations in the second metal plate arrangement or an (separate) insert. Preferably, the spacers could be used to form different chambers which are electrically isolated from each other. There could be a separate chamber for each of the sub printed circuit board arrangements.

In another preferred embodiment of the mobile communication antenna, a second printed circuit board arrangement is provided. The second metal plate arrangement is then arranged between the first and second printed circuit board arrangements. The second printed circuit board arrangement is spaced apart from the second metal plate arrangement. As such, a third free space is formed between the second printed circuit board arrangement and the second metal plate arrangement. Preferably, a calibration network is disposed on the second printed circuit board arrangement. Communication lines could be established between the second printed circuit board arrangement and the first printed circuit board arrangement. Preferably, those communication lines are free of any cables. As such, solid electrical contact pins could be used.

In another preferred embodiment of the mobile communication antenna, the first metal plate arrangement comprises a plurality of elevations or elevation lines facing the first side of the first printed circuit board arrangement and defining different chambers. In addition or alternatively, the second metal plate arrangement comprises a plurality of elevations or elevation lines facing the second side of the first printed circuit board arrangement and preferably defining different chambers. In addition or alternatively, the second metal plate arrangement comprises a plurality of elevations or elevation lines facing the second printed circuit board arrangement and preferably defining different chambers. As such, a chamber could be defined by elevations in the form of a single solid line or by a plurality of solid lines or a plurality of separated elevations. Those elevations could also define the width of the respective first, second and/or third free space and thereby acting as a spacer. To form such electrically isolated chambers, the spacers from the first and the second metal plate arrangements preferably are electrically connected to each other. This could be realized by using through hole plating in the first printed circuit board arrangement or other metallic connections between both spacers, which are smaller than the surface of the spacer, which it touches and carries the printed circuit board arrangement. In addition, parasitic resonances in the first and/or second free space can be avoided or suppressed.

In another preferred embodiment of the mobile communication antenna, the plurality of elevations or elevation lines of the first metal plate arrangement are bonded to the first printed circuit board arrangement with an electrically conductive adhesive. In addition or alternatively thereto, they could also be soldered to the first printed circuit board arrangement. In addition or alternatively, the plurality of elevations or elevation lines of the second metal plate arrangement are bonded to the first printed circuit board arrangement by the use of an electrically conductive adhesive and/or are soldered thereto. In addition or alternatively, the plurality of elevations or elevation lines of the second metal plate arrangement are bonded to the second printed circuit board arrangement by the use of an electrically conductive adhesive and/or soldered thereto. Furthermore, through hole platings (vias) are used to electrically connect two layers on different sides of the respective first and/or second printed circuit board arrangement to each other.

Preferably, a first chamber is formed in the first free space by the use of the first and/or second shieldings and/or by the use of plurality of separate elevations and/or elevation lines introduced in the first metal plate arrangement and directed towards the first printed circuit board arrangement, wherein (the second side of) the first printed circuit board arrangement comprises a metal layer so that the first chamber is enclosed by:
  a) the second side of the first metal plate arrangement; and
  b) the respective first and/or second shieldings and/or the plurality of separate elevations and/or the elevation line(s) of the first metal plate arrangement; and
  c) the metal layer (on the second side) of the first printed circuit board arrangement.

The respective first and/or second shieldings and/or the plurality of separate elevations and/or the elevation line(s) are galvanically connected to the metal layer (on the second side) of the first printed circuit board arrangement. Through hole platings (vias) inserted into the first printed circuit board arrangement can be used to achieve this connection.

Instead of the metal layer (on the second side) of the first printed circuit board arrangement, the first chamber could also be enclosed by the second metal plate arrangement. In that case, the second metal plate arrangement also comprises first and/or second shieldings and/or a plurality of separate elevations which are directed towards to second side of the first printed circuit board arrangement. They are preferably electrically connected to through hole platings (vias) within the first printed circuit board arrangement so that they are electrically connected to the first and/or second shieldings and/or to the plurality of separate elevations and/or to the elevations lines of the first metal plate arrangement.

More preferably, such a first chamber exists for each polarization and more preferably for each column of dual-polarized radiators.

Preferably, a second chamber is formed in the second free space by the use of the first and/or second shieldings and/or by the use of plurality of separate elevations and/or elevation lines introduced in the second metal plate arrangement and directed towards the first printed circuit board arrangement, wherein (the first side of) the first printed circuit board arrangement comprises a metal layer so that the second chamber is enclosed by:
  a) the second metal plate arrangement; and
  b) the respective first and/or second shieldings and/or the plurality of separate elevations and/or the elevation line(s) of the second metal plate arrangement; and
  c) the metal layer (on the first side) of the first printed circuit board arrangement.

More preferably, such a second chamber exists for each polarization and more preferably for each column of dual-polarized radiators.

Preferably, a third chamber is formed in a free space (between the second metal plate arrangement and the second printed circuit board arrangement) by the use of the first and/or second shieldings and/or by the use of plurality of separate elevations and/or elevation lines introduced in the second metal plate arrangement and directed towards the second printed circuit board arrangement, wherein (the second side of) the second printed circuit board arrangement comprises a metal layer so that the third chamber is enclosed by:
 a) the second metal plate arrangement; and
 b) the respective first and/or second shielding and/or the plurality of separate elevations and/or the elevation line(s) of the second metal plate arrangement; and
 c) the metal layer (on the second side) of the second printed circuit board arrangement.

More preferably, such a third chamber exists for each polarization and more preferably for each column of dual-polarized radiators.

Instead of the metal layer (on the second side) of the second printed circuit board arrangement, the third chamber could also be enclosed by the third metal plate arrangement. In that case, the third metal plate arrangement also comprises first and/or second shieldings and/or a plurality of separate elevations which are directed towards to second side of the second printed circuit board arrangement. They are preferably electrically connected to through hole platings (vias) within the second printed circuit board arrangement so that they are electrically connected to the first and/or second shieldings and/or to the plurality of separate elevations and/or to the elevations lines of the second metal plate arrangement.

Preferably, a fourth chamber is formed in another free space (between the second printed circuit board arrangement and the third metal plate arrangement) by the use of the first and/or second shieldings and/or by the use of plurality of separate elevations and/or elevation lines introduced in the third metal plate arrangement and directed towards the second printed circuit board arrangement, wherein (the first side of) the second printed circuit board arrangement comprises a metal layer so that the fourth chamber is enclosed by:
 a) the third metal plate arrangement; and
 b) the respective first and/or second shielding and/or the plurality of separate elevations and/or the elevation line(s) of the third metal plate arrangement; and
 c) the metal layer (on the first side) of the second printed circuit board arrangement.

More preferably, such a fourth chamber exists for each polarization and more preferably for each column of dual-polarized radiators.

The first and second printed circuit board arrangements could also be electrically connected to each other for data transmission.

The respective first and/or second shielding and/or the plurality of separate elevations and/or the elevation line(s) of the first, second and/or third metal plate arrangement could also be named as separation element in general. In that case, the separation element would be a stamping in the respective metal plate arrangement. The separation element should be impermeable for the frequency of the mobile communication signal. Openings (if any) within the separation element should be smaller than $\lambda/4$ or smaller than $\lambda/6$ or smaller than $\lambda/8$.

In another preferred embodiment of the mobile communication, a part of the first feed connection which runs through the first opening is soldered to the other part of the first feed connection which runs parallel to the first metal plate arrangement. The part of the first feed connection which runs through the opening is enclosed by a solid dielectric material.

In another preferred embodiment of the mobile communication, the mobile communication antenna is configured to operate in TDD-mode.

The dipole radiator can especially be used in the frequency range of 600 MHz to 3600 MHz or to 8400 MHz.

BRIEF DESCRIPTION OF THE DRAWINGS

Different embodiments of the invention will be described in the following, by way of example and with reference to the drawings. The same elements are provided with the same reference signs. The figures show in detail:
FIG. 1A: a mobile communication antenna according to one embodiment of the present invention;
FIG. 1B: various columns comprising dual-polarized radiators of the mobile communication antenna of FIG. 1A;
FIGS. 2A, 2B, 2C: different embodiments of a first printed circuit board arrangement which is arranged next to a first metal plate arrangement of the mobile communication antenna;
FIGS. 8A, 8B: side views of different embodiments of the mobile communication antenna.

DETAILED DESCRIPTION

Figure 3A:
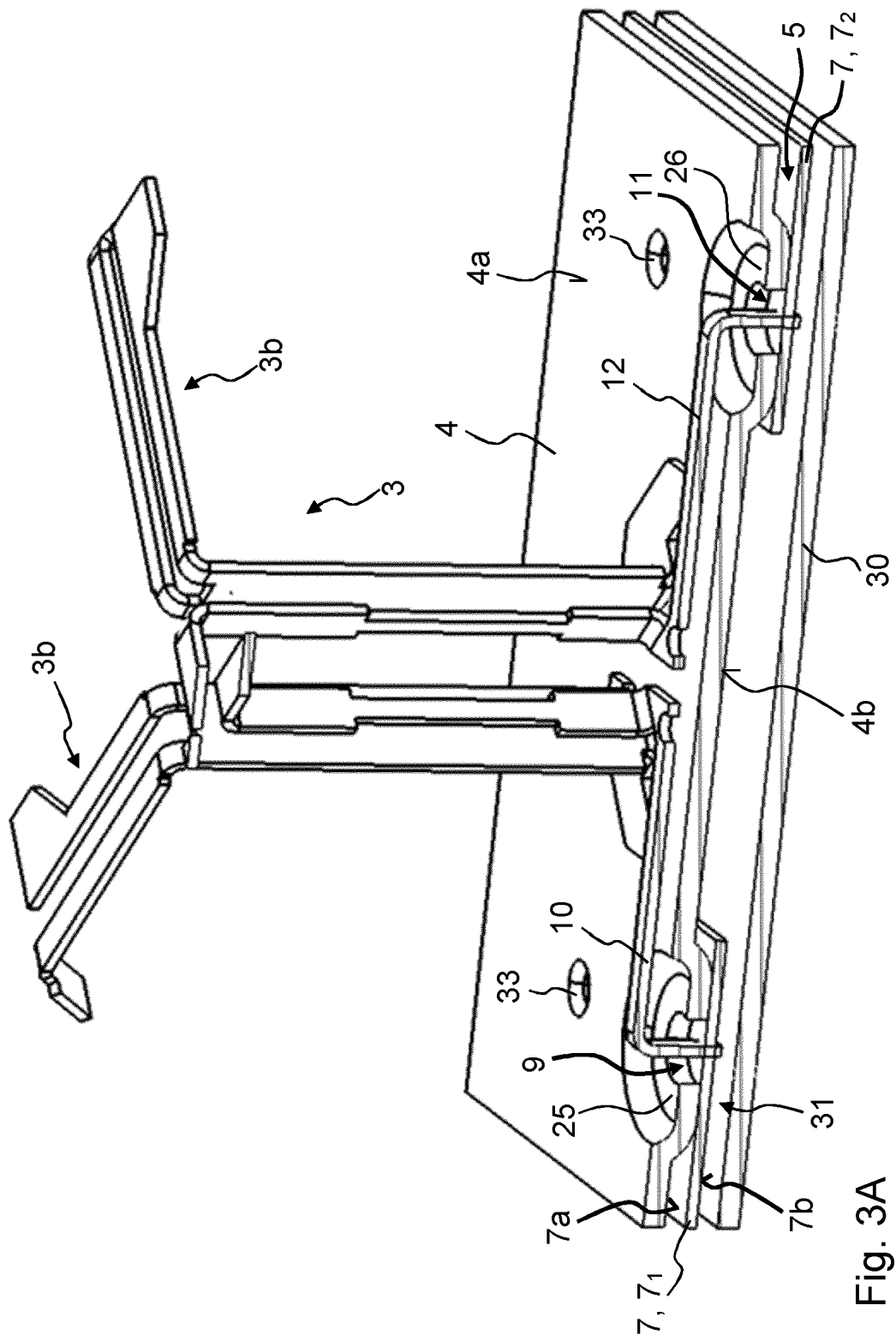
FIGS. 3A, 3B: three-dimensional views of a part of the mobile communication antenna with one dual-polarized radiator.

FIG. 1A shows a mobile communication antenna 1 according to one embodiment of the present invention. FIG.

1B shows various columns 2, each comprising a plurality of dual-polarized radiators 3. Each dual-polarized radiator 3 can transmit and receive mobile communication signals in two different polarizations. The polarizations could be for example linear +45°/−45° slant, linear 0°/90° horizontal and vertical.

The dual-polarized radiators 3 are arranged on a first metal plate arrangement 4. The dual-polarized radiators 3 are thereby arranged on a first side 4a of the metal plate arrangement 4.

According to FIG. 1B there are four columns 2, each comprising five dual-polarized radiators 3. There could also be more columns 2 or fewer columns 2. For example, there could be 2, 3, 4, 5, 6, 7, 8, 9, 10, 11, 12 or more than 12 columns. Each column could also comprise more dual-polarized radiators 3 or fewer dual-polarized radiators 3. For example, there could be 2, 3, 4, 5, 6, 7, 8, 9, 10, 11, 12 or more than 12 dual-polarized radiators 3 in each column 2.

In addition, a first printed circuit board arrangement 7 is arranged on a second side 4b of the first metal plate arrangement 4. The first printed circuit board arrangement 7 could be made of single printed circuit board of a plurality of sub printed circuit board arrangements $7_1, 7_2, \ldots, 7_n$.

The first metal plate arrangement 4 comprises at least one first opening 9 through which a first feed connection 10 of the dual-polarized radiator 3 passes. The first metal plate arrangement 4 also comprises at least one second opening through which a second feed connection 12 passes. Each dual-polarized radiator 3 comprises a first feed connection 10 and a second feed connection 12. The first feed connection 10 is used to transmit a first mobile communication signal of a first polarization to the respective dual-polarized radiator 3 and to receive a first mobile communication signal in a first polarization from the respective dual-polarized radiator 3. The second feed connection 12 is used to transmit a second mobile communication signal of a second polarization to the respective dual-polarized radiator 3 and to receive a second mobile communication signal having a second polarization from the respective dual-polarized radiator 3.

The first and the second feed connection 10, 12 are galvanically isolated from the first metal plate arrangement 4. Preferably they are air-microstrip lines.

The first and the second opening 9, 11 could be made in a laser and/or stamping process.

The first feed connection 10 is electrically connected to a first signal line 15 on the first printed circuit board arrangement 7. The electrical connection could be a capacitive connection. However, the electrical connection is preferably a galvanic connection.

The first printed circuit board arrangement 7 comprises a first side 7a and a second side 7b. The first side 7a is facing the metal plate arrangement 4. The first signal line 15 runs preferably over its entire length or over its predominant length on the second side 7b of the first printed circuit board arrangement 7.

Figure 5B:
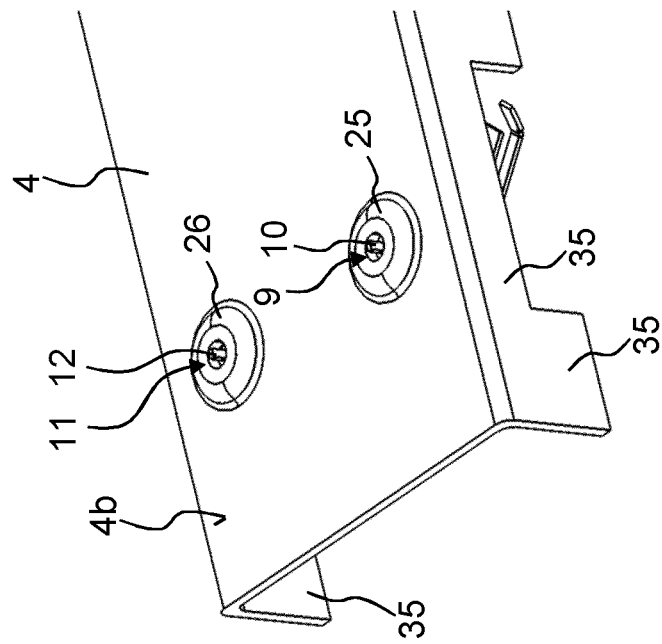
FIGS. 5A, 5B, 5C: different three-dimensional views of a part of the mobile communication antenna.
Figure 5A:
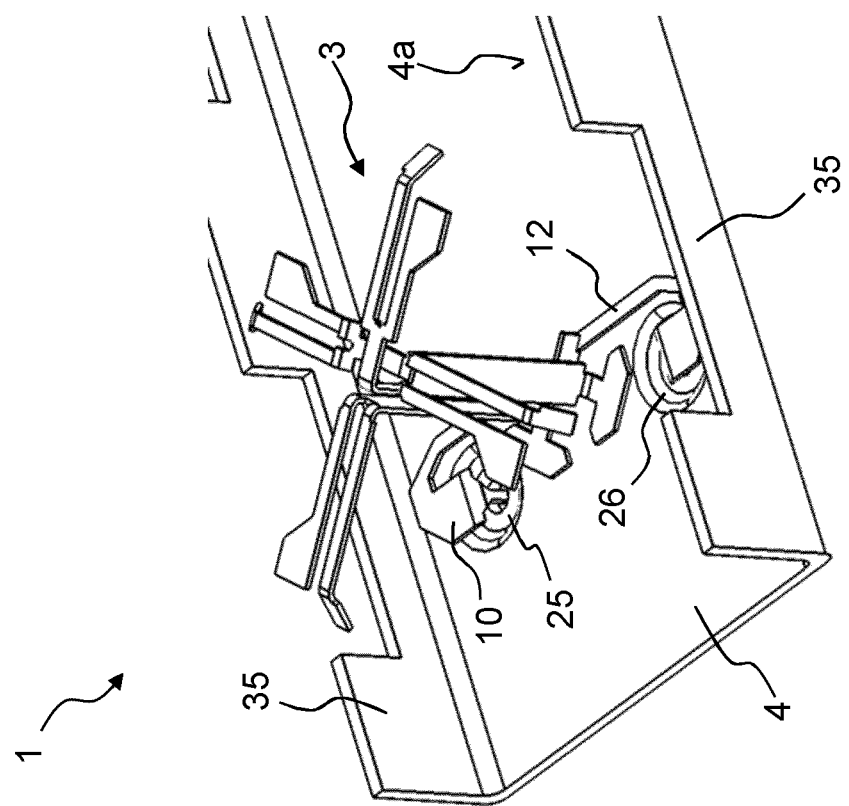
Figure 5C:
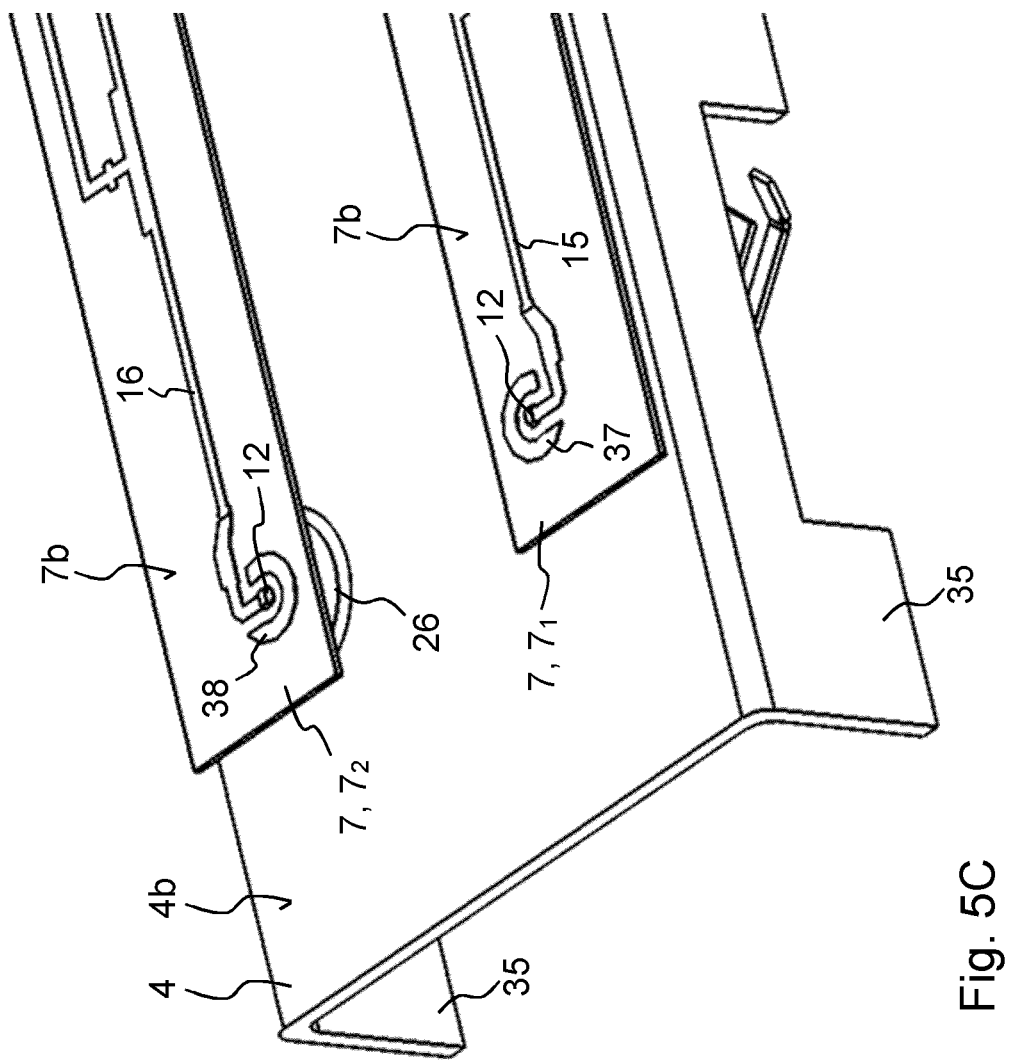

There is also a second line 16 (see FIG. 5C). The second feed connection 12 is electrically connected to the second signal line 16. The first and the second signal lines 15, 16 are galvanically isolated from each other and preferably run in separate chambers. As such, the electrical isolation is preferably higher than 30 dB, 33 dB or higher than 35 dB. The second signal line 16 runs preferably over its entire length or over its predominant length on the second side 7b of the first printed circuit board arrangement 7.

The first and the second feed connection 10, 12 could therefore pass through the first printed circuit board arrangement 7, so that the first and/or second feed connection 10, 12 are electrically connected (for example soldered) to the respective first and second signal lines 15, 16 on the second side 7b of the first printed circuit board arrangement 7.

More preferably, respective first and second phase shifter arrangements 20 are arranged on the first printed circuit board arrangement 7. Preferably, the first and the second phase shifter arrangements 20 are arranged on the second side 7b of the first printed circuit board arrangement 7.

More preferably, for each column 2, a first phase shifter arrangement 20 is connected to the first feed connections 10 of the respective dual-polarized radiators 3 which are arranged in the respective column 2. In addition, for each column, a second phase shifter arrangement 20 is connected to the second feed connections 12 of the respective dual-polarized radiators 3 which are arranged in the respective column 2.

As can be seen in FIG. 1B, the first printed circuit board arrangement 7 comprises a plurality of sub printed circuit board arrangements $7_1, 7_2, 7_3, 7_4, \ldots, 7_n$. Each of the sub printed circuit board arrangements $7_1, 7_2, 7_3, 7_4, \ldots, 7_n$ extend in the longitudinal direction of the mobile communication antenna 1. The respective sub printed circuit board arrangements $7_1, 7_2, 7_3, 7_4, \ldots, 7_n$ are spaced apart from each other. The sub printed circuit board arrangements $7_1, 7_2, 7_3, 7_4, \ldots, 7_n$ alternately receive only first or only second feed connections 10, 12 of the dual-polarized radiators 3. The first sub printed circuit board arrangement $7_1$ only receives a first feed connection 10 of dual-polarized radiators 3 which are arranged in the first column 2. The last sub printed circuit board arrangement $7_n$ only receives first or second feed connections 10, 12 of dual-polarized radiators 3 of the last column 2. The sub printed circuit board arrangements $7_2, 7_3, 7_4$ which are arranged between the first and the last sub printed circuit board arrangement $7_1, 7_n$ receive feed connections 10, 12 from dual-polarized radiators 3 which are located into adjacent columns 2 respectively. In other words, the first sub printed circuit board arrangement $7_1$ only receives first feed connections of the dual-polarized radiators 3 which are arranged in the first column 2. In turn, the second sub printed circuit board arrangement $7_2$ only receives second feed connections 12 of dual-polarized radiators 3 which are arranged in the first and in the second column 2. In turn, the third printed circuit board arrangement $7_3$ only receives first feed connections 10 of dual-polarized radiators 3 which are arranged in the second and third column 2. In turn, the fourth sub printed circuit board arrangement $7_4$ only receives second feed connections 12 of dual-polarized radiators 3 which are arranged in the third and fourth column 2. In turn, the fifth and last sub printed circuit board arrangement $7_n$ only receives a first feed connection 10 from dual-polarized radiators 3 which are arranged in the last column 2.

Alternatively, the first printed circuit board arrangement 7 could also extend at least predominantly across all columns 2 of the mobile communication antenna 1 and therefore receive both the first and the second feed connections 10, 12 of the dual-polarized radiators 3 in all columns 2.

The mobile communication antenna 1 also comprises a radome 21 which encloses the plurality of dual-polarized radiators 3 as well as the first metal plate arrangement 4 and the first printed circuit board arrangement 7.

FIG. 1A also shows that a free space 5 is formed between the first metal plate arrangement 4 and the first printed circuit board arrangement 7. This means that the first side 7a of the first printed circuit board arrangement 7 does not rest directly on the second side 4b of the first metal plate arrangement 4. It can also be seen that the first feed connection 10 of the at least one dual-polarized radiator 3 is surrounded over the predominant length (or the entire length) in the first free space 5 by an electrically conductive first shielding 25. The first shielding does not contact the first feed connection 10. As such, an E-field is created between the first feed connection 10 and the first shielding 25 during the operation of the first mobile communication antenna 1. Preferably there is air between the first feed connection 10 and the first shielding 25. However, there could also be a dielectric material inserted between the first feed connection 10 and the first shielding 25. In that case, the respective part of the first feed connection that runs approximately perpendicular to the first metal plate arrangement 4 through the first opening 9 could be a separate part together with the surrounding dielectric material and therefore be inserted into the first opening 9 and soldered to the first signal line 15 and the rest of the first feed connection 10.

The same is also true for the second feed connection 12 which is surrounded over a predominant length (or the entire length) in the first free space 5 by an electrically conductive second shielding 26. Preferably there is air between the second feed connection 12 and the second shielding 26. However, there could also be a dielectric material inserted between the second feed connection 12 and the second shielding 26. In that case, the respective part of the second feed connection 12 that runs approximately perpendicular to the first metal plate arrangement 4 through the second opening 11 could be a separate part together with the surrounding dielectric material and therefore be inserted into the second opening 11 and soldered to the second signal line 16 and the rest of the second feed connection 12.

The connection between the dual-polarized radiator 3 and the respective first and/or second signal line 15, 16 on the first printed circuit board arrangement 7 is preferably free of cables.

FIGS. 2A, 2B and 2C show various embodiments on how the respective first and/or second feed connection 10, 12 is electrically connected to the respective first and/or second signal line 15, 16. It is also described how the first and/or second shielding 25, 26 operates.

As can be seen, there is a second metal plate arrangement 30. The second metal plate arrangement 30 could comprise a single metal plate or a plurality of metal plates. The second metal plate arrangement 30 could be made of sheet metal or of a plastic covered with an electrically conductive material.

The first printed circuit board arrangement 7 is arranged between the first and the second metal plate arrangement 4, 30. Preferably, there is a second free space 31 between the second metal plate arrangement 30 and the first printed circuit board arrangement 7. Within FIG. 2A, the distance d1 between the first printed circuit board arrangement 7 and the first metal plate arrangement 4 is smaller than the distance d2 between the first printed circuit board arrangement 7 and second metal plate arrangement 30. The distance d1 is preferably larger than 1 mm, 2 mm or larger than 3 mm but preferably smaller than 7 mm or 5 mm. The distance d2 is preferably larger than 3 mm, 4 mm, 5 mm, 6 mm, 7 mm, 8 mm, 9 mm, 10 mm, 11 mm but preferably smaller than 12 mm, 10 mm, 8 mm, 6 mm or smaller than 4 mm. As such, the E-field which is generated between the first signal line 15 and the first metal plate arrangement 4 is stronger than the E-field (not shown) between the first signal line 15 and the second metal plate arrangement 30.

The dual-polarized radiators 3 comprises a first dipole and a second dipole. The first dipole is used to receive and transmit a mobile communication signal having a first polarization, wherein the second dipole is used to receive and transmit a second mobile communication signal having a second polarization. Each first and second dipole comprises a first dipole half 3a and a second dipole half 3b. In that case the first dipole half 3a is connected to the first feed connection 10, wherein the second dipole half 3b is electrically connected (galvanically or capacitively) to ground and therefore to the first metal plate arrangement 4. The same is also true for the second dipole. The first dipole half 3a of the second dipole is (galvanically) connected to the second feed connection 12, wherein the second dipole half 3b of the second dipole is connected (galvanically or capacitively) to ground and therefore to the first metal plate arrangement 4.

FIG. 2A also shows that the first signal line 15 exclusively runs on the second side 7b of the first printed circuit board arrangement 7.

The first shielding 25 is open to one side but extends from the second side 4b of the first metal plate arrangement 4 to the first side 7a of the first printed circuit board arrangement 7 and also rests on the first printed circuit board arrangement 7 (however, this does not have to be necessarily the case). The same could also be true for the second shielding 26.

Within FIG. 2B, the second metal plate arrangement 30 is arranged closer to the first printed circuit board arrangement 7. As such, the distance d2 is preferably larger than 1 mm, 2 mm, 3 mm, 4 mm or larger than 5 mm, but preferably smaller than 6 mm, 5 mm, 4 mm, 3 mm or smaller than 2 mm. As a result, an E-field is generated between the first signal line 15 and the first metal plate arrangement 4 as well as between the first signal line 15 and the second metal plate arrangement 30. Of course, this is also true for the second signal line 16. In the drawings both reference signs have therefore been added.

Within FIG. 2C it can be seen that the first printed circuit board arrangement 7 comprises at least one via 32, so that first signal line 15 not only runs on the second side 7b of the first printed circuit board arrangement 7 but also on the first side 7a of the first printed circuit board arrangement 7. The at least one via 32 is preferably arranged at positions where the first signal line 15 changes its shape, width and/or direction. This could also be the case for the second signal line 16.

FIG. 2A shows a suspended micro strip. As same is also true for FIG. 2B. FIG. 2C shows a symmetric suspended micro strip (triplate).

Figure 3B:
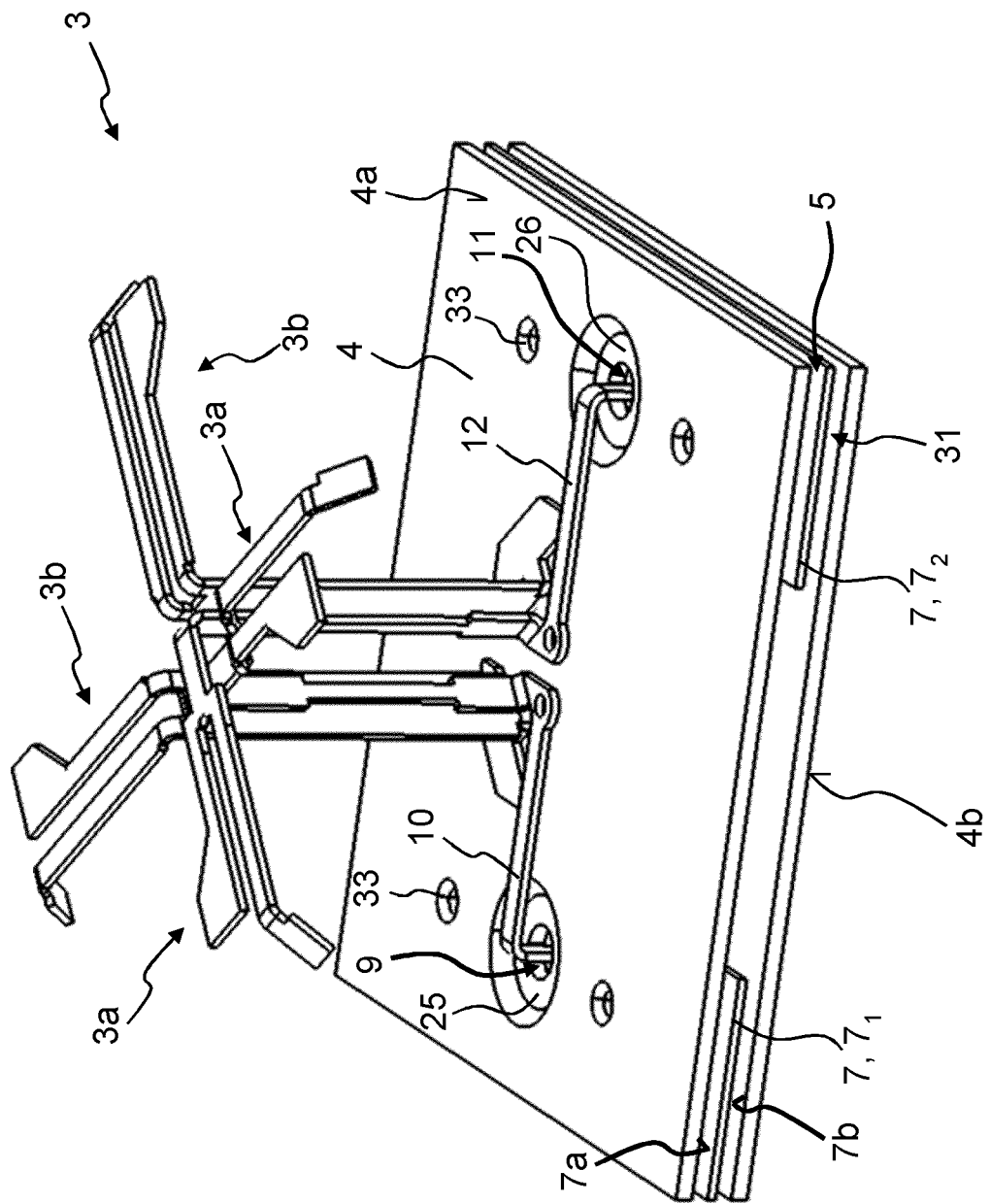

FIGS. 3A and 3B show three-dimensional views of a part of the mobile communication antenna 1 with one dual-polarized radiator 3. As can be seen, the dual-polarized radiator 3 comprises a first dipole and a second dipole. The first dipole comprises a first and a second dipole half 3a, 3b and a second dipole also comprises a first and a second dipole half 3a, 3b. The first dipole half 3a of the first dipole is formed by the first feed connection 10 and the first dipole half 3a of the second dipole is formed by the second feed connection 12. The second dipole half 3b of the first dipole has a structure which is preferably broader than the structure of the first feed connection 10 and is connected to ground. The same is also true for the second dipole half 3b of the second dipole. As can also be seen, the first and the second feed connections 10, 12 are galvanically isolated from the first metal plate arrangement 4. Preferably, there is free space between the respective first and second feed connections 10, 12 and the first side 4a of the first metal plate arrangement 4. As such, the first and second feed connections 10, 12 are preferably unsymmetrically air-lines, which operate with/against the first metal plate arrangement 4 as ground.

The dual-polarized radiator(s) 3 could also be patch radiator(s).

As can be seen, the first shielding 25 is an integral part with the first metal plate arrangement 4. The first shielding 25 is manufactured by a forming process. The same is also true for the second shielding 26.

The first shielding and the second shielding 26 are a stamped part. Two respective first and second feed connections 10, 12 pass through the respective first and second opening 9, 11 which are preferably arranged in the center of the respective first and second shielding 25, 26.

Preferably, the inner parts of the respective first and second shielding 25, 26 extends more towards the respective first side 7a of the first printed circuit board arrangement 7 than the surrounding parts of the first and second shielding 25, 26. In other words, the parts of the respective first and second shieldings 25, 26 which are arranged around the centered first and second openings 9, 11 are arranged closer to the first printed circuit board arrangement 7 that other parts of the first and second shieldings 25, 26 which are spaced apart further from the first and second openings 9, 11.

The first and/or second shielding 25, 26 is preferably frustoconical or cone-shaped.

More preferably, the opening has a circular cross section. The cross section could also be of any other shape (like rectangular). The diameter of the cross section of the first and/or second opening 9, 11 is preferably larger than 2 mm, 3 mm, 4 mm, 5 mm, 6 mm, 7 mm, 8 mm, 9 mm, 10 mm or larger than 11 mm, but preferably smaller than 12 mm, 10 mm, 8 mm, 6 mm, 4 mm or smaller than 3 mm.

More preferably, the first and/or second shielding 25, 26 rest on the first side 7a of the first printed circuit board arrangement 7.

More preferably, the first and/or second shielding 25, 26 is rotational symmetrical.

The first and/or second shielding 25, 26 is preferably fully closed in circumferential direction (FIG. 3B). However, it could also be possible, that the first and/or second shielding is partly open in the circumferential direction (FIGS. 2A, 2B, 2C). For example, the opening in the circumferential direction (360°) could be more than 5%, 10%, 15%, 20% of 360° but preferably less than 35%, 30%, 25%, 20%, 15% or less than 10% of 360°.

More preferably, the first and/or second shielding 25, 26 is flexible. Preferably, the first and/or second shielding 25, 26 is flexible along the longitudinal direction (namely towards and away from the first printed circuit board arrangement 7).

The first and/or second shielding 25, 26 is preferably free of any sharp edges that might be directed towards and damage the first printed circuit board arrangement 7.

The first and second feed connections 10, 12 preferably pass through the first printed circuit board arrangement 7. As such, the first and/or second feed connection 10, 12 is glued with an electrically conductive adhesive to the respective first and/or second signal line 15, 16 or soldered thereto.

It can also be seen that the first and second feed connections 10, 12 are connected to different sub printed circuit board arrangements $7_1$, $7_2$. The space between two sub printed circuit board arrangements $7_1$, $7_2$ is preferably filled with an electric conductive material, so that the isolation between those two sub printed circuit board arrangements $7_1$, $7_2$ increases. By the use of such an electric conductive material, the first and second metal plate arrangements 4, 30 are galvanically connected to each other. Preferably, the first metal plate arrangement 4 rests on the second metal plate arrangement 30.

The second metal plate arrangement 30 is also shown. Preferably, the first and the second shieldings 25, 26 also act as spacers between the first metal plate arrangement 4 and the first printed circuit board arrangement 7. Also additional elevations 33 are shown which are preferably free of an opening and which extend from the first metal plate arrangement 4 towards the first side 7a of the first printed circuit board arrangement 7. Preferably, the top of the respective elevations 33 rest on the first side 7a of the first printed circuit board arrangement 7. The elevations 33 are preferably a stamped part. A plurality of elevations 33 can be used to create different chambers on the first side 7a of the first printed circuit board arrangement 7, wherein those different chambers are electrically isolated from each other. In addition, these elevations 33 can suppress undesired parasitic resonances in the rear space behind the first metal plate arrangement 4. The distance between two elevations 33 has to be smaller than $\lambda/4$ or smaller than $\lambda/8$. $\lambda$ is the wavelength corresponding to the mid-frequency of the frequency band the dual-polarized radiators 3 is used for and the magnitude of the phase velocity of the medium surrounding the dual-polarized radiators 3.

The elevations 33 are preferably smaller in size (for example diameter) than the first and/or second shielding 25, 26.

In that case, a single printed circuit board could be used which comprises both, the first signal lines 15 as well as the second signal lines 16 for the respective dual-polarized radiators 3 in all columns 2. In that case, there could be a separate chamber for each column 2 for the first feed connections 10 in that chamber and a separate chamber for each column 2 for the second feed connections 12 in that chamber. Preferably, the second metal plate arrangement 30 could also comprise elevations 33 extending towards the second side 7b of the first printed circuit board arrangement 7. In that case, the first signal line 15 running on the second side 7b of the first printed circuit board arrangement 7 could be sealed in a separated chamber and therefore isolated from the second signal line 16 also running on the second side 7b of the first printed circuit board arrangement 7. The second signal line 16 could also be sealed in a separate chamber.

Preferably, elevations 33 formed in the first and second metal plate arrangements 4, 30 are located right above of each other with the first printed circuit board arrangement 7 arranged in between. A line going through the respective elevations 33 in the first and second metal plate arrangements 4, 30 would be aligned approximately perpendicular to the first printed circuit board arrangement 7.

The first dipole half 3a of the first and second dipole comprises the first feed connection 10. The first feed connection 10 is preferable an integral part of the first dipole half 3a. The first feed connection 10 ends at that end which is connected to the first printed circuit board arrangement 7. The other end of the first dipole half 3a is an open end which is spaced apart from the first metal plate arrangement 4 on the first side 4a and which forms a dipole wing or dipole arm. The feeding of the first dipole half 3a of the first dipole preferable only occurs through the respective first feed connection 10. The first dipole half 3a is preferable free of any other feeding connections. The same is also true for the first dipole half 3a of the second dipole comprising the second feed connection 12. The part of the first feed connection 10 and/or the second feed connection 12 which runs parallel to the first metal plate arrangement 4 is preferable longer than the following part which runs through the first or second opening 9, 11. The part of the first and second feed connection 10, 12 which runs through the first and second opening 9, 11 is preferable aligned approximately perpendicular to the first metal plate arrangement 4.

The second dipole half 3b of the first and second dipole which is preferable galvanically connected to the first metal plate arrangement 4 is further preferable only arranged on the first side 4a of the first metal plate arrangement 4.

The second dipole half 3b of the first and second dipole has preferable only one connection to the first metal plate arrangement 4. This connection is preferably achieved at the position of the respective foot of the second dipole half 3b.

FIGS. 4A, 4B, 4C and 4D show different embodiments of the first and/or second shielding 25, 26 between the first metal plate arrangement 4 and the first printed circuit board arrangement 7. Within FIG. 4A the shielding 25, 26 is a stamped part and in top view of the first side 4a of the metal plate arrangement 4 it has a concave form.

Figure 4A:
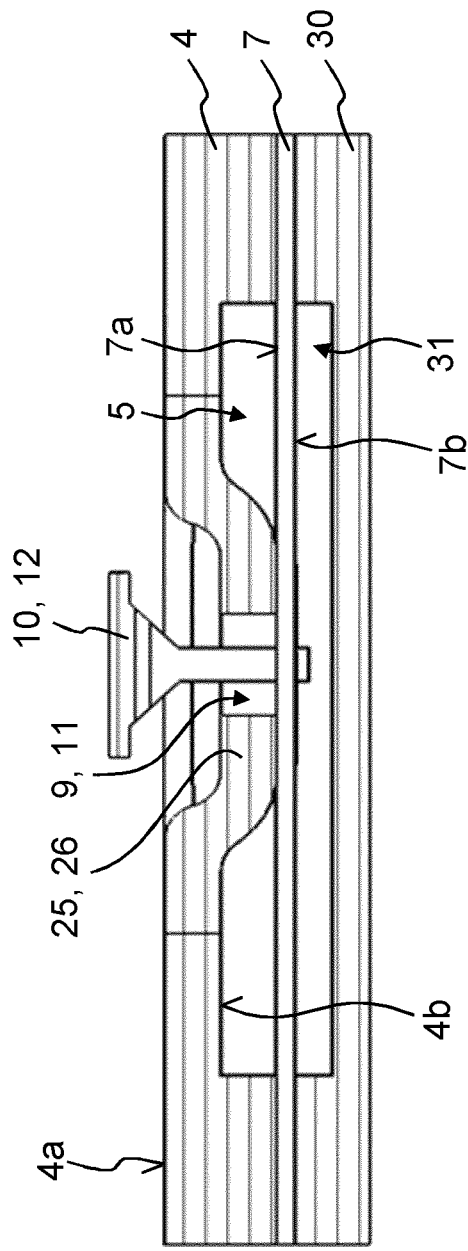
FIGS. 4A, 4B, 4C, 4D: different embodiments of a shielding between the first metal plate arrangement and the first printed circuit board arrangement.
Figure 4B:
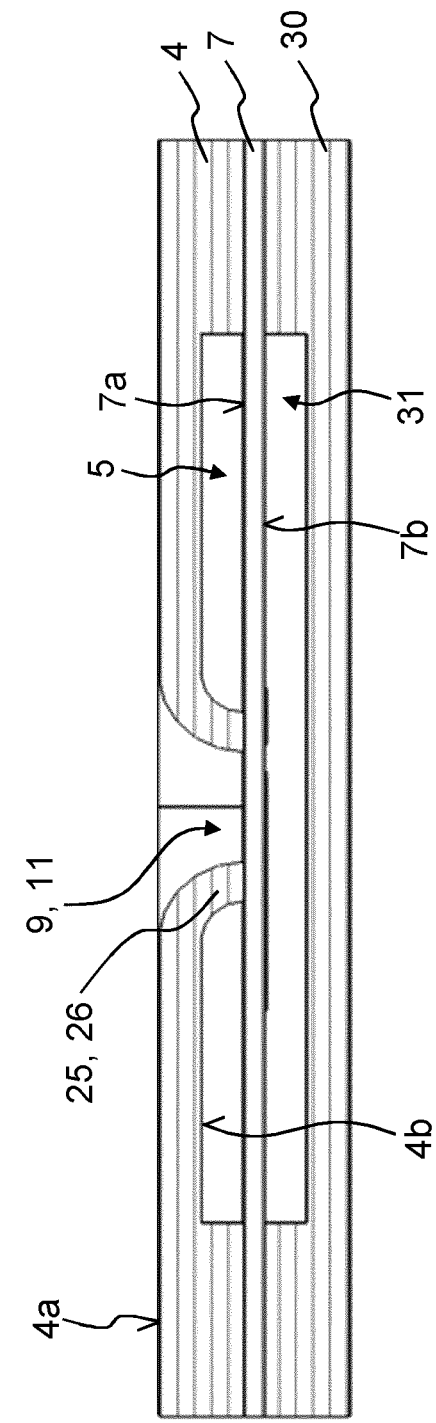

In FIG. 4B the shielding 25, 26 has a collar form and in top view of the first side 4a of the metal plate arrangement 4 it has a convex form.

Figure 4C:
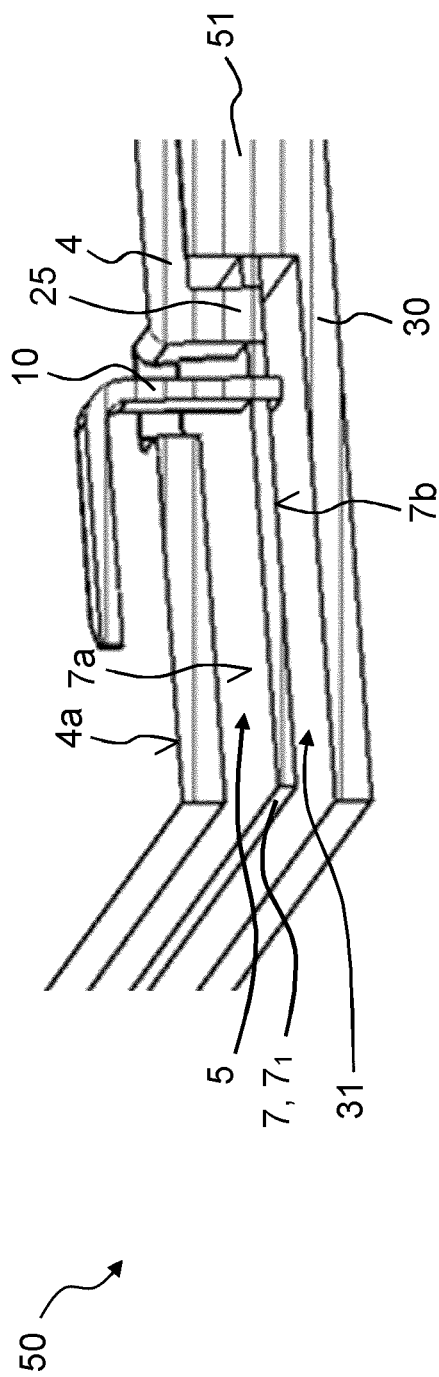

Within FIG. 4C the first and/or second shielding 25, 26 is a bent part. Care has to be taken that no sharp edges damage the first printed circuit board arrangement 7. The first printed circuit board arrangement 7 might comprise another opening into which the bent part of the first and/or second shielding 25, 26 is inserted. As can be seen, the first and/or second feed connection 10, 12 are not fully enclosed in the circumferential direction by the first and/or second shielding 25, 26 in this embodiment.

Figure 4D:
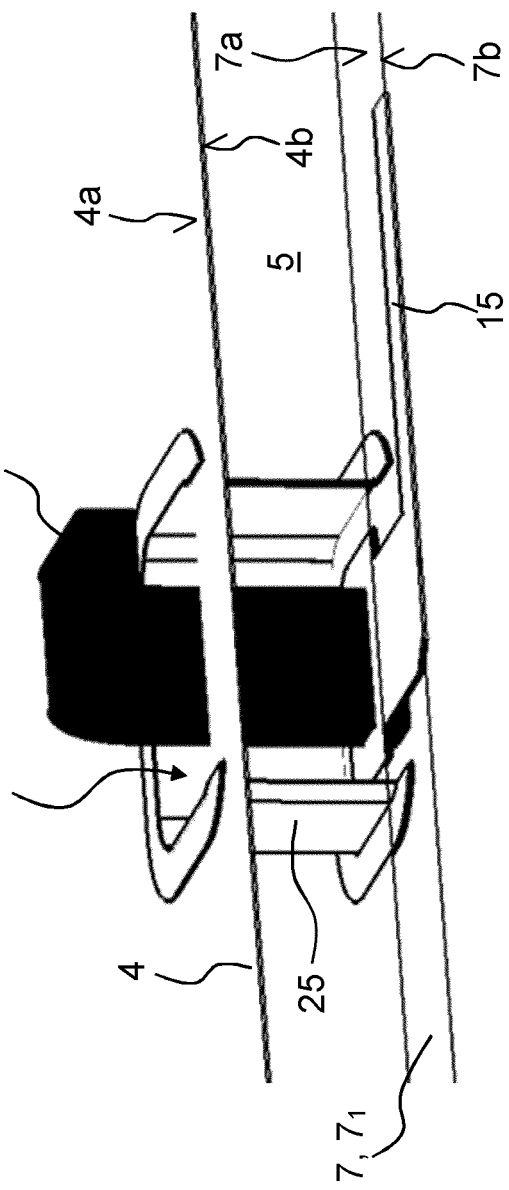

Within FIG. 4D the first and/or second shielding 25, 26 is an electrically conducted bushing. The bushing is inserted or pressed into the at least one first and/or second openings 9, 11 in the first metal plate arrangement 4. In addition, the bushing could also be soldered or glued with an electrically conductive adhesive to the first side 4a of the first metal plate arrangement 4. The bushing could (completely) enclose the first and/or second feed connection 10, 12 in circumferential direction. However, the bushing could also comprise some openings or slits for obtaining flexible characteristics.

FIG. 5A shows a three-dimensional view of the first side 4a of the first metal plate arrangement 4 together with a dual-polarized radiator 3. The respective dipole wings (or arms) of the first and second dipole half 3a, 3b of the first and second dipole each comprises two dipole arms. There are also partition walls running along the longitudinal direction of the respective column 2. The partition walls 35 are preferably aligned perpendicular to the respective first metal plate arrangement 4. The partition walls 35 and the first metal plate arrangement 4 are preferably formed of a single piece. As such, the respective columns 2 are decoupled from each other by the use of the partition walls 35. Furthermore, a beam forming and/or beam shaping of the mobile communication signal (reflections) occurs by the use of the first metal plate arrangement 4 together with the respective partition walls 35. The partition walls 35 preferably have a different height along the longitudinal axis. More preferably, the height is larger in areas where no dual-polarized radiator 3 is arranged and the height is smaller in areas closed to the respective dual-polarized radiators 3.

Furthermore, the first metal plate arrangement 4 preferably comprises a plurality of metal plates. More preferably, there is one metal plate for each column 2.

FIG. 5B shows a three-dimensional view the bottom of the first metal plate arrangement 4 without the first printed circuit board arrangement 7. The first and the second shieldings 25, 26 in form of a stamped structure are shown. The height of the stamped structures increases from the outside boundary towards the center. The first and second feed connections 10, 12 pass through the respective first and second opening 9, 11.

The first and second shielding 25, 26 preferably have the same height in the longitudinal direction. This is preferably also true for the elevations 33. Preferably the elevations 33 have the same height as the first and/or the second shielding 25, 26.

FIG. 5C shows another three-dimensional view of the bottom of the first metal plate arrangement 4. Contrary to FIG. 5B, FIG. 5C also shows the first printed circuit board arrangement 7. The first printed circuit board arrangement 7 comprises a first and a second sub-printed circuit board arrangement $7_1$, $7_2$. The first printed circuit board arrangement 7 comprises a first electrically conductive boundary structure 37 and/or a second electrically conductive boundary structure 38. The first boundary structure 37 surrounds the first signal line 15 in the region in which the first signal line 15 electrically contacts the first feed connection 10. The first boundary structure 37 is electrically isolated from the first signal line 10. The first boundary structure 37 is only partially open in the circumferential direction. As such, there is space for the first signal line 10 to emerge through this opening. The same is also true for the second boundary structure 38 which surrounds the second signal line 16 in the region in which the second signal line 16 electrically contacts the second feed connection 12. The second boundary structure 38 is also electrically isolated from the second signal line 12. The second boundary structure 38 is also only partially open in the circumferential direction. As such, the second signal line 12 can also emerge from this opening. As a result, the bandwidth increases.

The first and/or second boundary structure 37, 38 is preferably angular. In addition, or alternatively, the first and/or second boundary structure lay in the same plane of the first printed circuit board arrangement 7 as the portion of the first and/or second signal line 10, 12 which extends through the opening of the respective first and/or second boundary structure 37, 38.

Preferably, the first printed circuit board arrangement 7 only comprises one metal layer which is preferably arranged on the second side 7b of the first printed circuit board arrangement 7. The distance between the respective first and/or second signal line 15, 16 at the position where is connects the first and/or second feed connection 10, 12 to the respective first and/or second boundary structure 37, 38 is preferably larger than 20 mm, 30 mm, 40 mm, 50 mm, 60 mm, 70 mm and is further preferably smaller than 80 mm, 75 mm, 65 mm, 55 mm, 45 mm or smaller than 35 mm. More preferably, the distance is preferably smaller than $\lambda/2$, $\lambda/4$, $\lambda/6$ or smaller than $\lambda/8$.

The first and/or second boundary structure 37, 38 is preferably connected to ground. However, the first and/or second boundary structure 37, 38 could also be floating. More preferably, the first and/or second boundary structure 37, 38 extends around the point where the respective first and/or second signal line 15, 16 connects the respective first and/or second feed connection 10, 12 by more than 120°, 130°, 140°, 150°, 160°, 170°, 180°, 190°, 200°, 210°, 220°, 230° or by more than 240°, but by less than 250°, 240°, 230°, 220°, 210°, 200°, 190° or by less than 180°. As such, there is preferably always an opening. However, it could also be that the first and second boundary structure 37, 38 is arranged on the other (first) side 7a of the first printed circuit board arrangement 7.

Figure 6A:
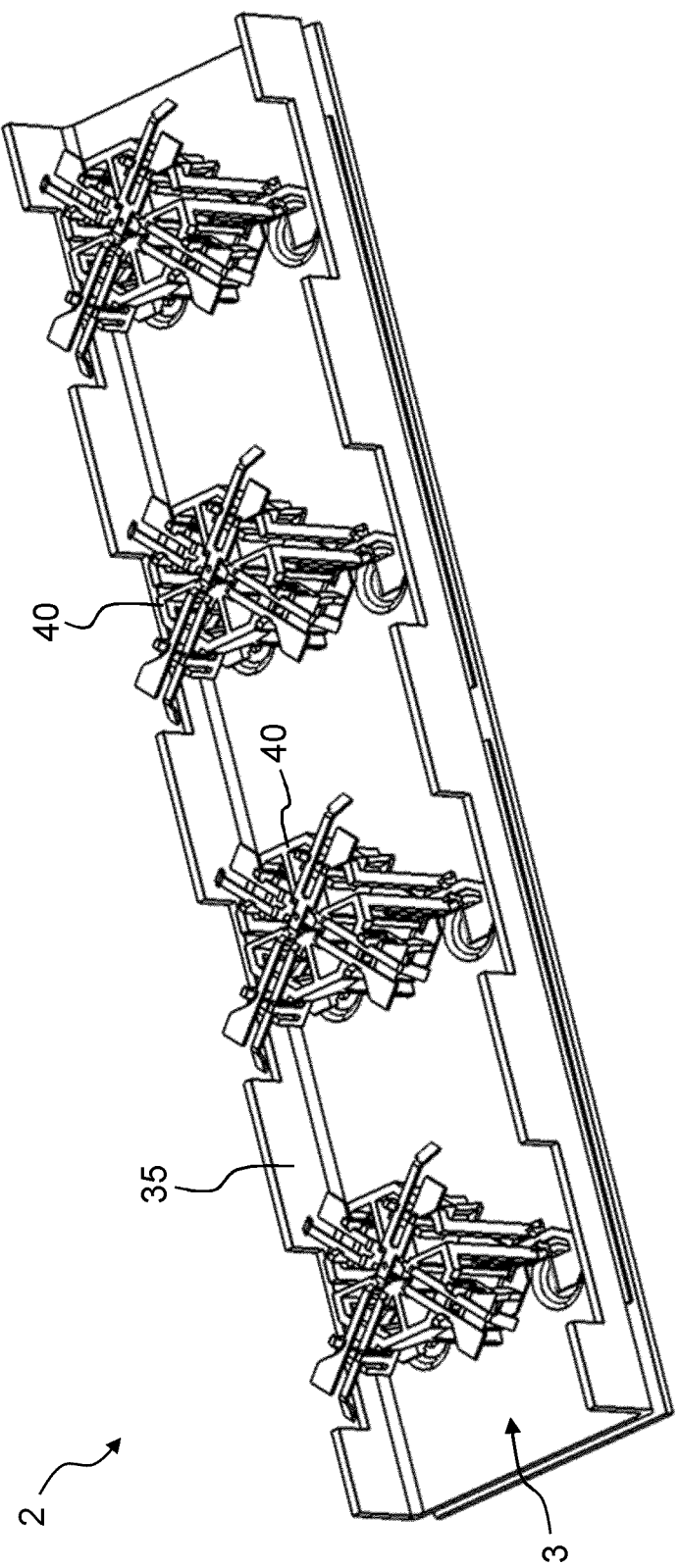
FIGS. 6A, 6B different three-dimensional views of a column of the mobile communication antenna.
Figure 6B:
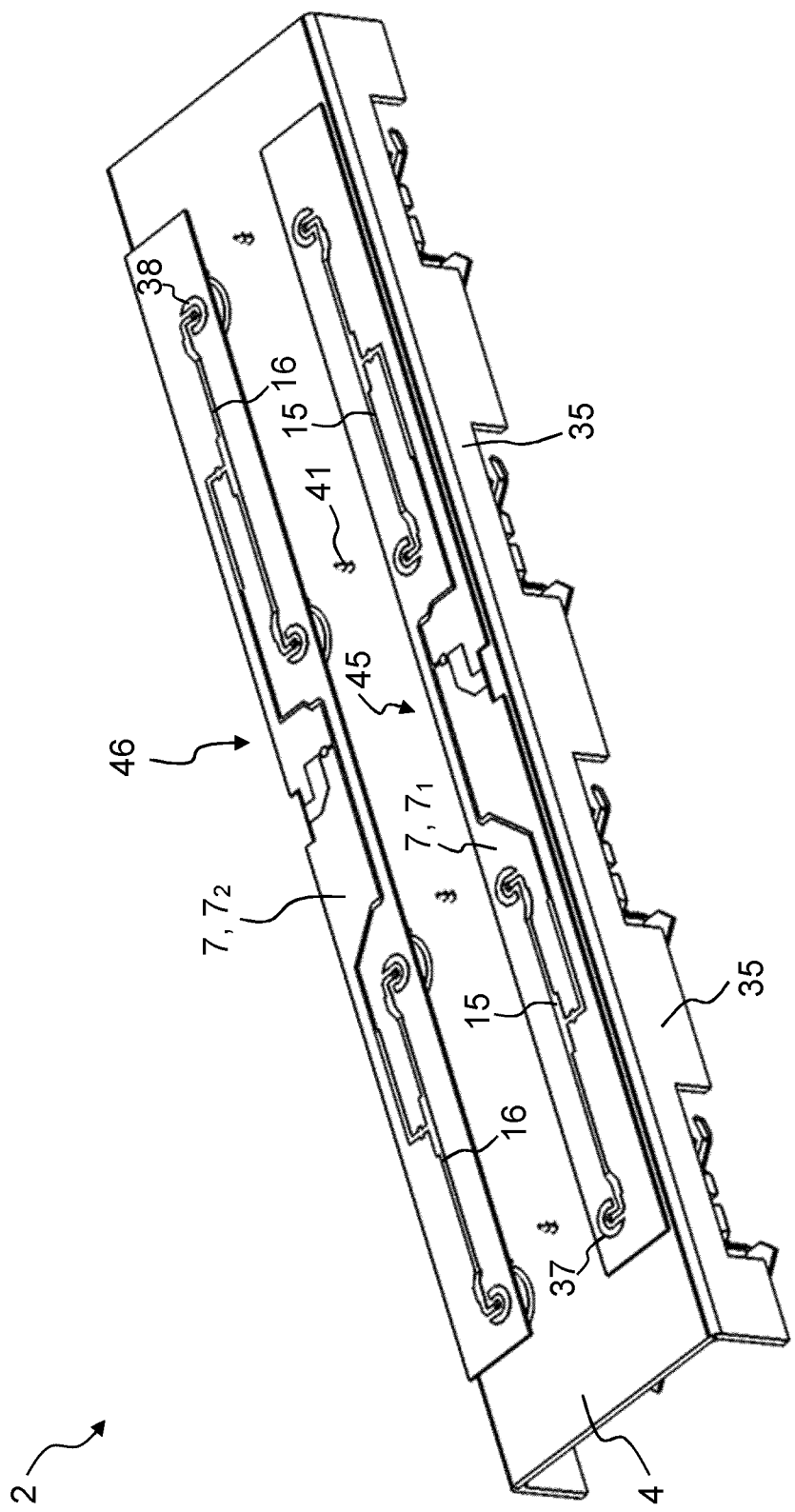

FIG. 6A shows another three-dimensional view of a column 2 of the mobile communication antenna 1. A plurality of dual-polarized radiators 3 are attached to the first metal plate arrangement 4. A holding structure 40 is used to hold the first and the second dipole with the respective first and second dipole half 3a, 3b. The holding structure 40 is a dielectric and preferably made of plastic. The holding structure 40 is more preferably made of a single piece. The respective first and second dipoles are preferably clipped to the holding structure 40. The holding structure 40 could in turn also be clipped to the first metal plate arrangement 4 as can be seen in FIG. 6B which shows the bottom side of the column 2 depicted in FIG. 6A.

Pins 41 of the holding structure 40 are pressed through the first metal plate arrangement 4.

A first phase shifter arrangement 45 is arranged on the first printed circuit board arrangement 7 or on the first sub-printed circuit board arrangement $7_1$. A second phase shifter arrangement 46 is arranged on the first printed circuit board arrangement 7 or on the second sub-printed circuit board arrangement $7_2$. Preferably, there are a plurality of first and second phase shifter arrangements 45, 46. More preferably, there is a first phase shifter arrangement 45 for each column 2. The first feed connections 10 of the respective dual-polarized radiators 3 of one column 2 are connected to the same first phase shifter arrangement 45. Preferably, there is also a second phase shifter arrangement 46 for each column 2. As such, the second feed connections 12 of the respective dual-polarized radiators 3 of the same column 2 are connected to the same second phase shifter arrangement 46. The first and second phase shifter arrangements 45, 46 both have a common port which could be connected to filter device for splitting the RX-pass from the TX-pass. The respective TX-pass could then be connected to the output of a power amplifier and the respective RX-pass could be connected to the input of a low noise amplifier.

Figure 7:
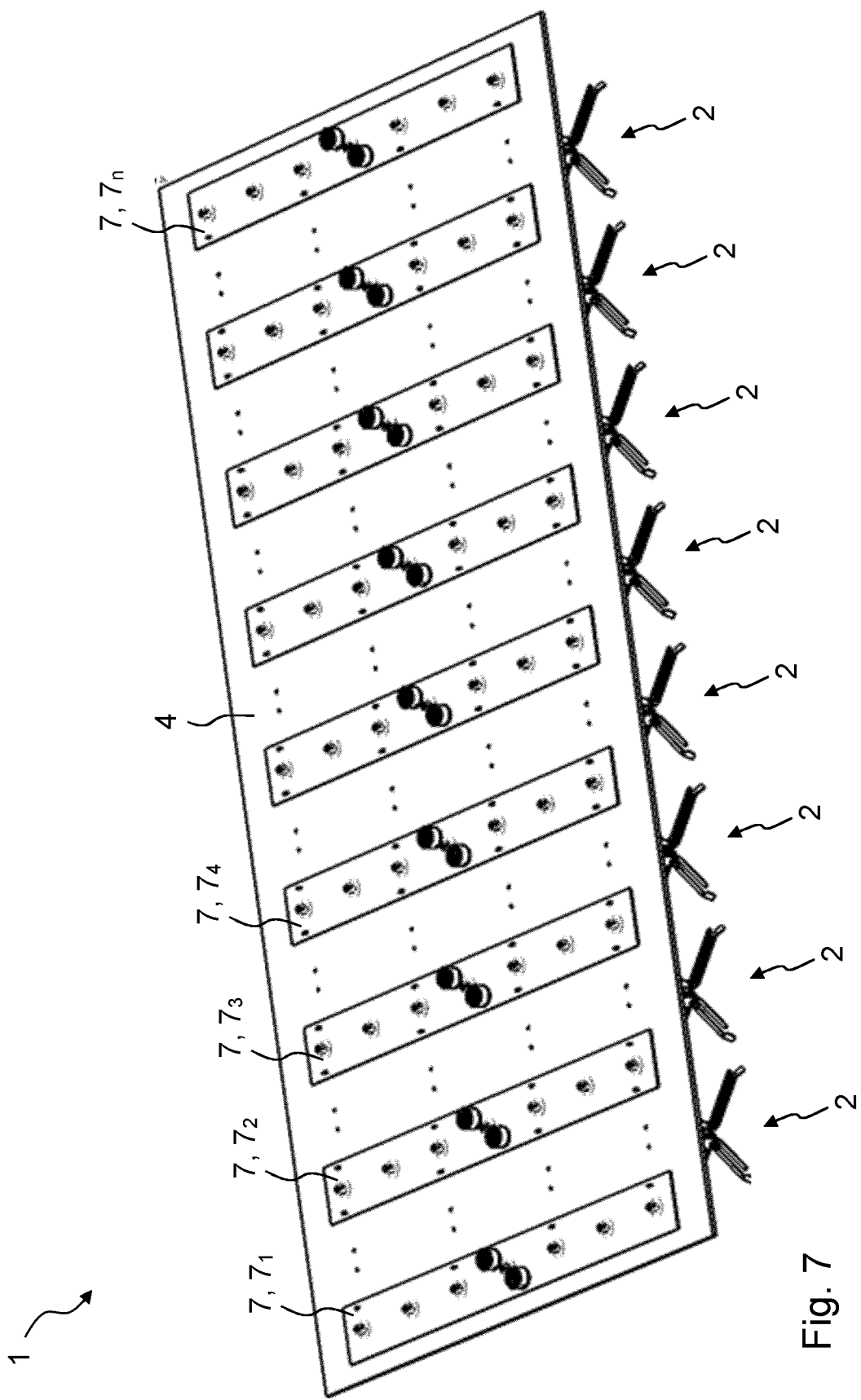
FIG. 7: a three-dimensional view of the bottom side of the mobile communication antenna showing different sub printed circuit board arrangements for each column.

FIG. 7 shows another embodiment of the mobile communication antenna 1. FIG. 7 also shows a three-dimensional view of the bottom. As can be seen, the mobile communication antenna 1 comprises a plurality of columns 2. The first printed circuit board arrangement 7 comprises nine first sub-printed circuit board arrangements $7_1, \ldots, 7_n$.

FIGS. 8A and 8B show side views of different embodiments of the mobile communication antenna 1. FIG. 8A describes that additional elements 48 are arranged on the second side 7b of the first printed circuit board arrangement 7. Those additional elements 48 could be for example components for the respective first and/or second phase shifter arrangement 45, 46 or amplifiers. In that case, the second side 7b of the first printed circuit board arrangement 7 is preferably not enclosed/covered by the second metal plate arrangement 30. Contrary to that, FIG. 8B shows that the first printed circuit board arrangement 7 is arranged between the first metal plate arrangement 4 and the second metal plate arrangement 30. A second free space 31 is also formed between the first printed circuit board arrangement 7 and the second metal plate arrangement 30. The first and the second metal plate arrangements 4, 30 and the first printed circuit board arrangement 7 are preferably connected to each other by the use of one or more screws 49.

It can also be seen that the first and/or second feed connection 10, 12 extend through the first printed circuit board arrangement 7 and rest on the second metal plate arrangement 30. It could also be soldered to the second metal plate arrangement 30 or glued by the use of electrically conductive adhesive thereto.

The second metal plate arrangement 30 could also only attached to the first metal plate arrangement 4 or to the first printed circuit board arrangement 7. The second metal plate arrangement 30 could also be attached to both, the first metal plate arrangement 4 and the first printed circuit board arrangement 7. Spacers could be used to maintain a distance so that the second free space 31 is formed.

Those spacers could be elevations 33 as previously described which could also be formed in the second metal plate arrangement or a separate insert 51. An additional shielding in the second metal plate arrangement 30 could also be used, which is constructed as described for the first and/or second shielding 25, 26.

Figure 9:
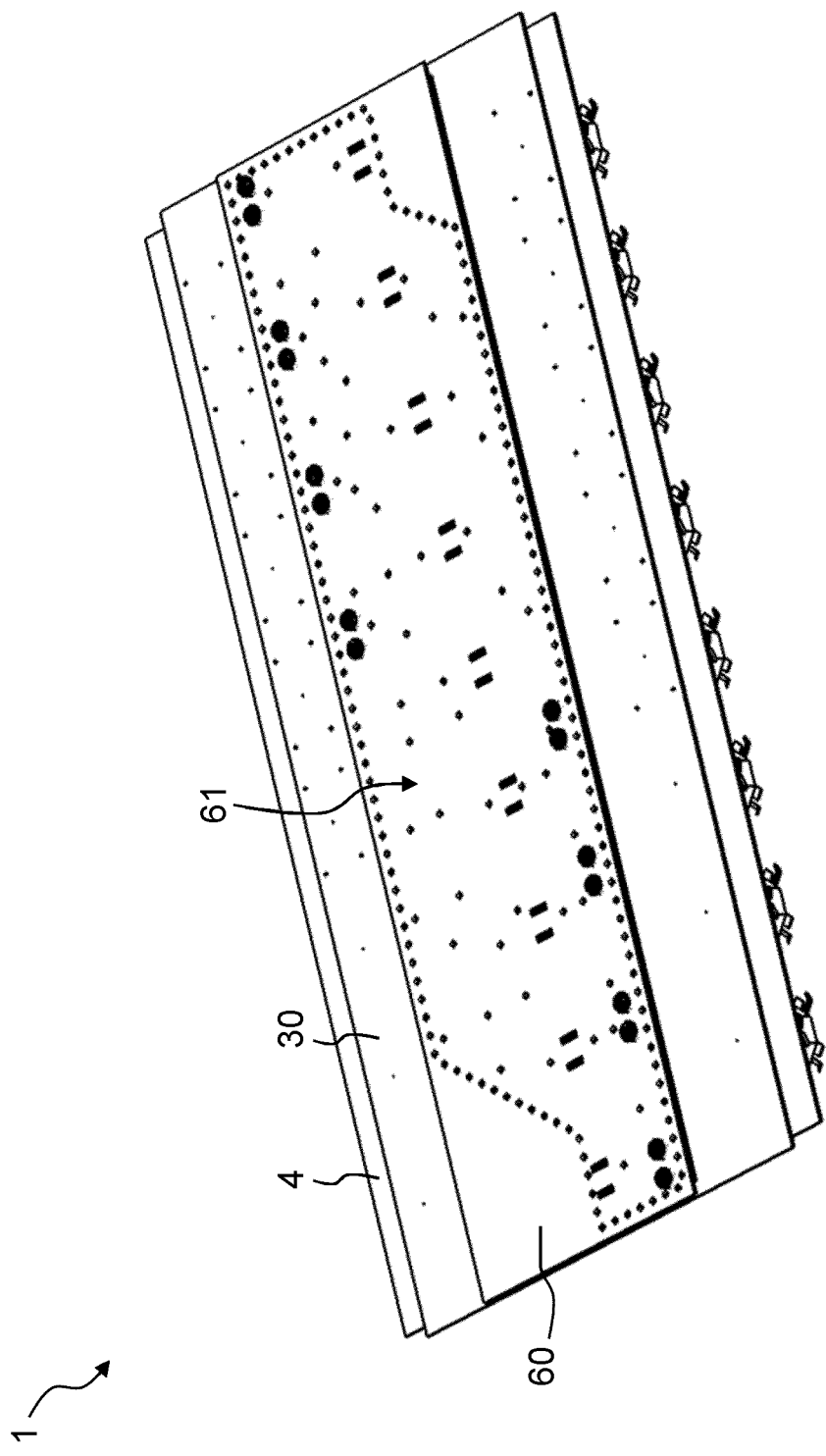
FIG. 9: a three-dimensional view of the bottom side of the mobile communication antenna showing a second printed circuit board arrangements.

FIG. 9 shows a three-dimensional view of the bottom side of the mobile communication antenna 1 comprising a second printed circuit board arrangement 60. In that case, the second metal plate arrangement 30 is arranged between the first and the second circuit board arrangements 7, 60. The second printed circuit board arrangement 60 is preferably spaced apart from the second metal plate arrangement 30. A calibration network 61 could be disposed on the first and/or second side of the second printed circuit board arrangement 60. The first side would be directed towards the second metal plate arrangement 30.

Figure 10:
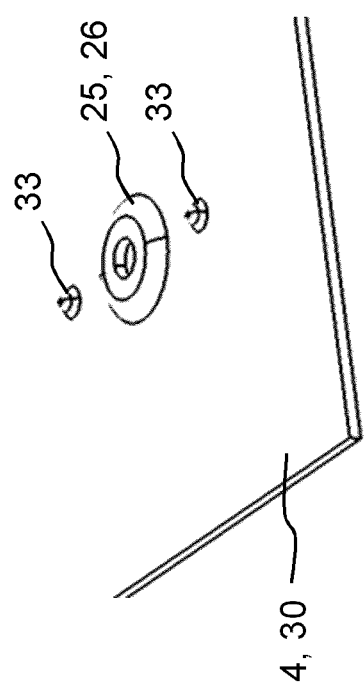
FIG. 10: a three-dimensional view of the first and/or second metal plate arrangement showing the shielding and elevations.

FIG. 10 shows a three-dimensional view of the first and/or second metal plate arrangement 4, 30. The respective first and/or second shielding 25, 26 as well as the elevations 33 are shown. Preferably, the first and/or second shielding 25, 26 as well as the respective elevations 33 have the same height. However, the first and/or second shielding 25, 26 has a larger diameter than the respective elevations 33. Both, the respective first and/or second shielding 25, 26 as well as the respective elevations 33 have preferably a circumferential cross section. Preferably, all those elements are made in a stamping process.

Figure 11B:
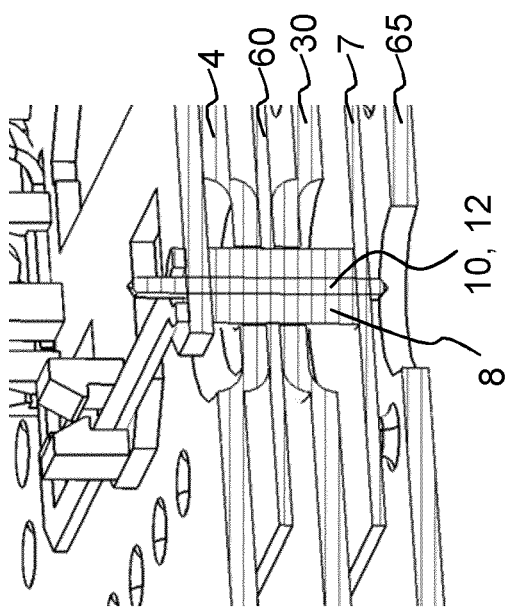
FIG. 11B: a three-dimensional view of a stacking of various printed circuit board arrangements and metal plate arrangements.
Figure 11A:
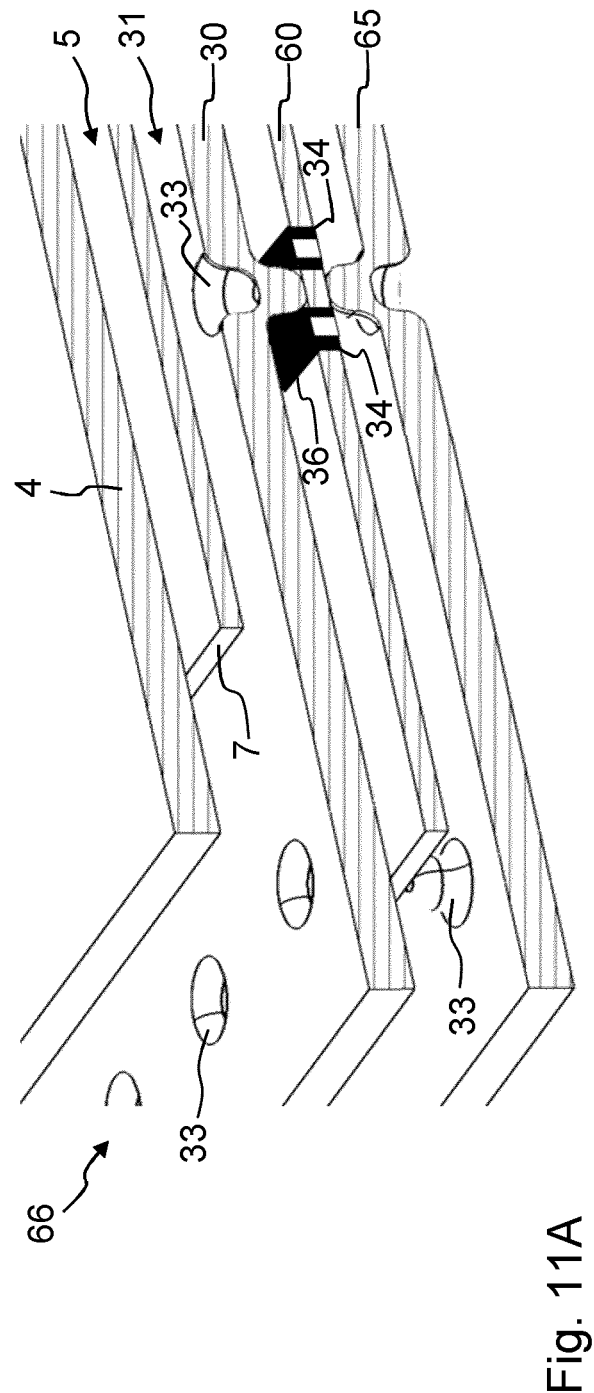
FIG. 11A: a three-dimensional view of a stacking of various printed circuit board arrangements and metal plate arrangements.

FIG. 11A shows a three-dimensional view the stacked first and second printed circuit board arrangements 7, 60 as well as of the first and second metal plate arrangements 4, 30 as well as of a third metal plate arrangement 65. The second printed circuit board arrangement 60 is arranged between the second and the third metal plate arrangements 30, 65. Elevations 33 in the second and third metal plate arrangements 30, 65 point towards the second printed circuit board arrangement 60. Those elevations 33 could be glued and/or soldered to the respective second printed circuit board arrangement 60. The glue is preferably electrically conductive. As such, there is always a free space between the respective metal plate arrangements 4, 30, 65 and the respective printed circuit board arrangements 7, 60. As can also be seen, a plurality of elevations 33 are arranged in a line 66 thereby forming a chamber on the respective printed circuit board arrangements 7, 60. Instead of using a plurality of elevations 33, which are arranged next to each other, an elevation line (non-stop) could be used. This elevation line would preferably be created in a stamping process. To improve the shielding between the formed chambers, the second printed circuit board arrangement 60 has at the locations of the elevations 33 or elevation lines through hole platings 34 and a small area of metallization 36 on both sides, which as a result electrically connects both elevations 33 from the second and the third metal plate arrangements 30, 65. Also a capacitively coupling of the metal layers (metallization 36) on both sides of the second printed circuit board arrangement 60 can be used. In this case the metal layers (metallization 36) shall be large enough to realize a capacitively coupling at the locations, where the elevation 33 or elevation lines touches the second printed circuit board arrangement 30. In that case there a third and fourth chamber would be formed as explained in the beginning. The same would also be true for the first and second chamber.

FIG. 11B shows that the part of the first feed connection 10 which passes through the first opening 9 is enclosed by a solid dielectric material 8. This part is further soldered to another part of the first feed connection 10 which runs parallel to the first metal plate arrangement 4. It is also shown that the first printed circuit board arrangement 7 is not arranged directly underneath the first metal plate arrangement but that the second printed circuit board arrangement 60 and the second metal plate arrangement 30 are located in between. In that case, there preferably more than one first shielding 25. The first and second metal plate arrangements 4, 30 each comprise a first shielding 25 through which the first feed connection 10 runs which is enclosed by the solid dielectric material 8. This could also be the case for the second feed connection 12.

Figure 12A:
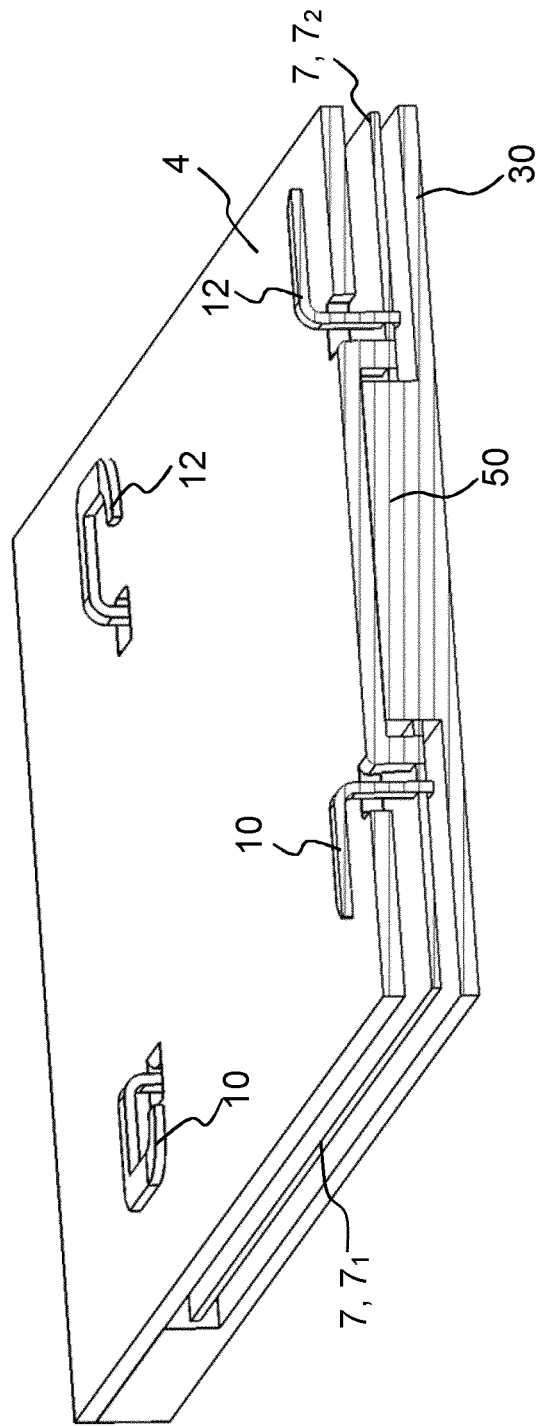
FIGS. 12A, 12B: various three-dimensional views of a stacking between the first printed circuit board arrangement and the first and second metal plate arrangements, wherein a spacer used.
Figure 12B:
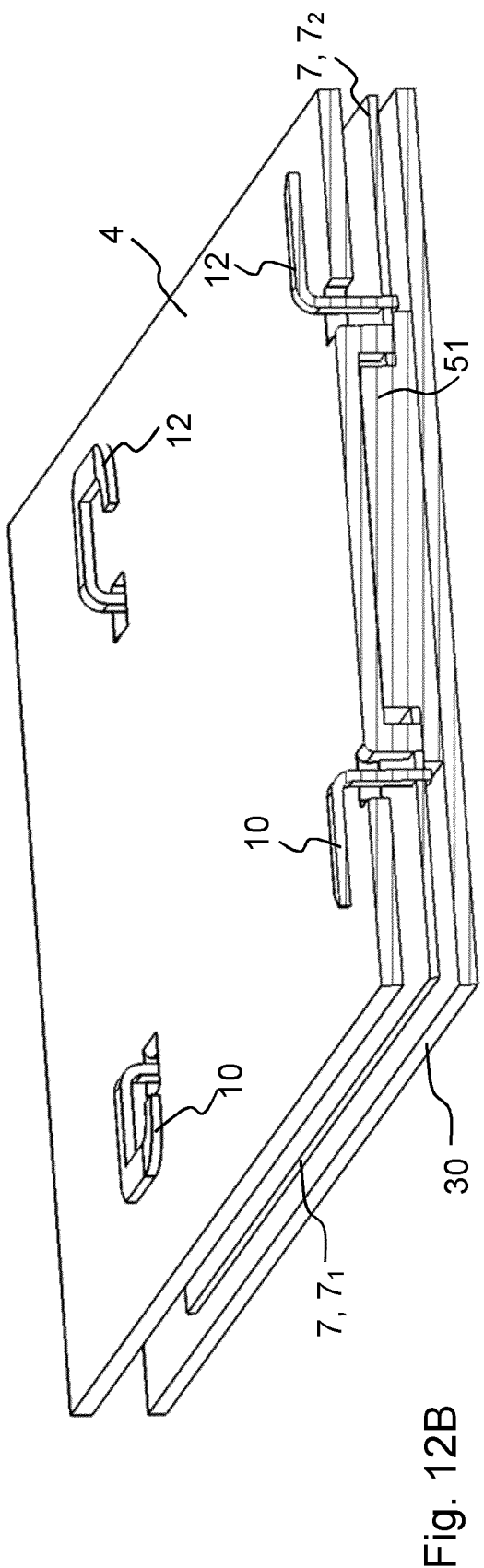

FIGS. 12A, 12B show various three-dimensional views of the first printed circuit board arrangement 7 and the first and second metal plate arrangements 4, 30. A separate insert 51 (FIG. 12B) is used which (electrically) connects the first and the second metal plate arrangements 4, 30. The insert 51 is preferably a separate piece which is arranged in free space between two sub printed circuit board arrangements $7_1$, $7_2$. In that case, both sub printed circuit board arrangements $7_1$, $7_2$ are decoupled (electrically isolated) from each other. The insert 51 lays between the first and the second metal plate arrangement 4, 30 and is therefore clamped between both metal plate arrangements 4, 30. The insert 51 preferably extends in the longitudinal direction of the mobile communication antenna 1 and has more preferably a similar length compared to the column 2. The insert 51 insures that both polarization of the respective dual-polarized radiators 3 in the same column 2 do not interact with each other (high-decoupling). The decoupling between both polarization is preferably above 30 dB, 32 dB or above 35 dB. If the insert is separate part as shown in FIG. 12B, then the cross section is preferably T-shaped. In addition or alternatively to the use of an insert 51, the first and/or second metal plate arrangement 4, 30 could also comprise a shoulder 50 (FIG. 12A) which is an integral part of the respective first and/or second metal plate arrangement 4, 30 and which extends towards the other metal plate 30, 4. The shoulder 50 has preferably the same dimensions as the insert 51 (preferably extends in the longitudinal direction of the mobile communication antenna 1 and separates both sub printed circuit board arrangements $7_1$, $7_2$).

More preferably, a part of the first and/or second shielding 25, 26 of the first metal plate arrangement 4 could rest on the insert 51 (as shown in FIG. 12B) or on the shoulder (not shown).

Figure 13A:
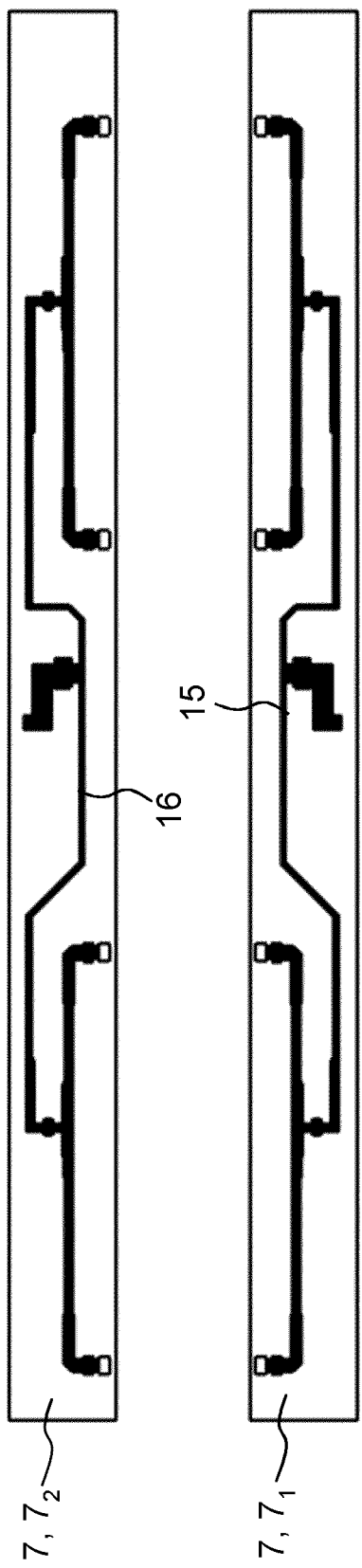
FIG. 13A, 13B: different embodiments of the first printed circuit board arrangement.
Figure 13B:
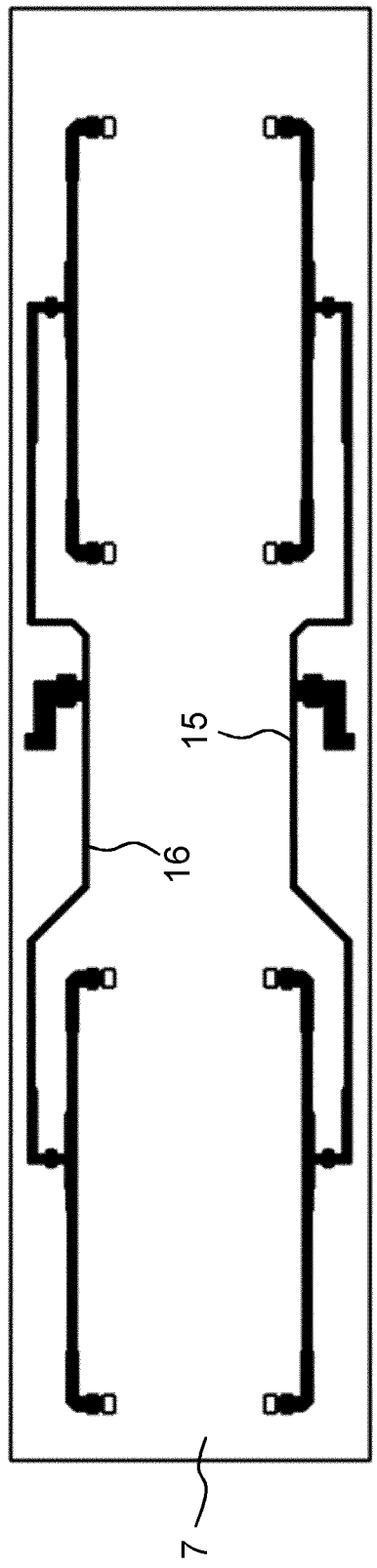

FIGS. 13A, 13B show different embodiments of the first printed circuit board arrangement 7. Within FIG. 13A, the first printed circuit board arrangement 7 comprises two sub printed circuit board arrangements $7_1$, $7_2$. Each sub printed circuit board arrangement $7_1$, $7_2$ is preferably used for one polarization only. Those sub printed circuit board arrangements $7_1$, $7_2$ are preferably individual printed circuit boards. More preferably, the respective first and second signal lines 15, 16 are only arranged on one side of the respective sub printed circuit board $7_1$, $7_2$.

Contrary to that, FIG. 13B shows that the first printed circuit board arrangement 7 is a single printed circuit board which comprises both the first and the second signal lines 15, 16.

In that case, a decoupling is preferably obtained by the use of a plurality of elevations 33 and/or the shoulder 50 and/or the inlay 51 arranged between the first and the second signal lines 15, 16.

The first and/or second and/or third metal plate arrangement 4, 30, 65 is preferably made of aluminium. The first metal plate arrangement 4 could also be named as reflector arrangement.

The thickness of the first and/or second printed circuit board arrangement is probably larger than 0.25 mm, 0.3 mm, 0.4 mm, 05 mm, 0.6 mm or larger than 0.7 mm, but is also preferably smaller than 0.8 mm, 0.75 mm, 0, 65 mm, 0.55 mm, 0.45 mm, or is preferably smaller than 0.35 mm. The material of dielectric element of the first and/or second printed circuit board arrangement has a relative permittivity between 2 and 4.5.

The metal layer on the first and/or second printed circuit board arrangement 7, 16 could be either only on one or on both sides.

On the second printed circuit board arrangement 60 a filter network, additional phase shifter arrangements and/or a radio board could be arranged on.

It really beneficial that a first and/or the second shielding 25, 26 is preferably an integral part of the respective first metal plate arrangement 4 and therefore the shielding is free of any soldering. Preferably, only the first and second feed connections 10, 12 are soldered and/or glued to the respective first and second signal lines 15, 16 on the first printed circuit board arrangement 7.

The first and/or second and/or third metal plate arrangement 4, 30, 65 are preferably not made in an extrusion process.

Instead of a soldering technique between the respective first, second, third metal plate arrangement 4, 30, 65 and the neighboring first and/or second printed circuit board arrangement 7, 60, a gluing process, especially a jet-dispension production technology can be used.

The first and/or second and/or third metal plate arrangement 4, 30, 65 do not need to be sheet metal parts. Also die-casting parts or metalized injection molding parts of molded interconnected devices (mid) can be used.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A Mobile communication antenna with at least one dual-polarized radiator, comprising the following features:
a first metal plate arrangement, wherein the at least one dual-polarized radiator is disposed on a first side of the first metal plate arrangement;
a first printed circuit board arrangement is provided, wherein the first printed circuit board arrangement is arranged on a second side of the first metal plate arrangement;
a first free space formed between the first printed circuit board arrangement and the first metal plate arrangement;

the first metal plate arrangement comprises at least one first opening through which a first feed connection for a first polarization of the at least one dual-polarized radiator is passed;

the first feed connection is electrically connected to a first signal line on the first printed circuit board arrangement;

the first feed connection of the at least one dual-polarized radiator is surrounded over the predominant length in the first free space by an electrically conductive first shielding in a non-contacting manner, whereby an E-field is created between the first feed connection and the first shielding during operation of the mobile communication antenna, a second metal plate arrangement is provided, the first printed circuit board arrangement being arranged between the first and second metal plate arrangements;

the second metal plate arrangement is attached to the first metal plate arrangement and/or to the first printed circuit board arrangement via spacers.

2. The Mobile communication antenna according to claim 1, characterized by the following feature:

the first shielding is integral with first metal plate arrangement and manufactured by a forming process; or the first shielding is an electrically conductive bushing inserted or pressed into the at least one first opening in the first metal plate arrangement.

3. The Mobile communication antenna according to claim 2, characterized by the following feature:

the first shielding is a bent and/or stamped part and is:
   a) bent approximately 90° relative to the first metal plate arrangement in the direction of the first printed circuit board arrangement; or
   b) frustoconical; or
   c) cone-shaped; or
   d) collar-shaped.

4. The Mobile communication antenna according to claim 1, characterized by the following feature:

the first shielding rests on the first printed circuit board arrangement.

5. The Mobile communication antenna according to claim 1, characterized by the following features:

the first printed circuit board arrangement comprises a first side facing the first metal plate arrangement and a second side opposite to the first side;

the first feed connection is galvanically connected to the first signal line, which runs entirely or predominantly on the second side of the first printed circuit board arrangement.

6. The Mobile communication antenna according to claim 1, characterized by the following features:

the first printed circuit board arrangement comprises a first electrically conductive boundary structure;

the first boundary structure surrounds the first signal line in the region in which it contacts the first feed connection;

the first boundary structure is electrically isolated from the first signal line;

the first boundary structure is only partially open in the circumferential direction, with the first signal line emerging from this opening.

7. The Mobile communication antenna according to claim 6, characterized by the following features:

the first boundary structure is annular; and/or the first boundary structure lies in the same plane of the first printed circuit board arrangement as the portion of the first signal line exiting the opening of the first boundary structure.

8. The Mobile communication antenna according to claim 1, characterized by the following feature:

the first printed circuit board arrangement comprises at least one via at a position of the first signal line where the shape, width and/or direction of the first signal line changes.

9. The Mobile communication antenna according to claim 1, characterized by the following features:

a plurality of dual-polarized radiators are provided which are arranged in a plurality of columns, wherein each of the plurality of columns extends in the longitudinal direction of the mobile communication antenna and wherein the columns are spaced apart from each other;

the first metal plate arrangement comprises a plurality of first openings through each of which a first feed connection for a first polarization of the respective dual-polarized radiators is passed;

the first metal plate arrangement comprises a plurality of second openings through each of which a second feed connection for a second polarization of the respective dual-polarized radiators is passed;

the first feed connections are electrically connected to a respective first signal line on the first printed circuit board arrangement;

the second feed connections are electrically connected to a respective second signal line on the first printed circuit board arrangement;

the first feed connections are each surrounded in the first free space over the predominant length without contact by an electrically conductive first shielding, whereby an E-field is formed between the respective first feed connection and the respective first shielding;

the second feed connections are each surrounded in the first free space over the predominant length without contact by an electrically conductive second shielding, whereby an E-field is formed between the respective second feed connection and the respective second shielding;

a maximum of one of the first feed connections is passed through each of the respective first openings;

a maximum of one of the second feed connections is passed through each of the respective second openings.

10. The Mobile communication antenna according to claim 9, characterized by the following features:

the first printed circuit board arrangement comprises a plurality of sub printed circuit board arrangements ($7_1$, $7_2$, ..., $7_n$) each extending in the longitudinal direction of the mobile communication antenna, wherein the sub printed circuit board arrangements ($7_1$, $7_2$, ..., $7n$) are spaced apart from each other;

the sub printed circuit board arrangements ($7_1$, $7_2$, ..., $7_n$) alternately receive only first or only second feed connections of the dual-polarized radiators;

the first sub printed circuit board arrangement ($7_1$) only receives first or second feed connections of dual-polarized radiators of the first column; and the last sub printed circuit board arrangement ($7_n$) only receives first or second feed connections from dual-polarized radiators of the last column;

sub printed circuit board arrangements ($7_2$, $7_3$, $7_4$) which are arranged between the first and last sub printed circuit board arrangements ($7_1$, $7_n$) receive feed connections from dual-polarized radiators located in two adjacent columns, respectively;

or the first printed circuit board arrangement extends at least predominantly across all columns of the mobile communication antenna and receives both the first and second feed connections of the dual-polarized radiators.

11. The Mobile communication antenna according to claim 9, characterized by the following features:

a plurality of first and second phase shifter arrangements are arranged on the first printed circuit board arrangement;

for each column, a first phase shifter arrangement is connected to the first feed connections of the respective dual-polarized radiators of the respective column;

for each column, a second phase shifter arrangement is connected to the second feed connections of the respective dual-polarized radiators of the respective column.

12. The Mobile communication antenna according to claim 1, characterized by the following feature:

the spacers are:
 a) elevations in the first and/or second metal plate arrangement; and/or
 b) a shoulder of the first and/or second metal plate arrangement; and/or
 c) a separate insert.

13. The Mobile communication antenna according to claim 1, characterized by the following features:

a second printed circuit board arrangement is provided, wherein the second metal plate arrangement is arranged between the first and second printed circuit board arrangements;

the second printed circuit board arrangement is spaced apart from the second metal plate arrangement;

a calibration network is disposed on the second printed circuit board arrangement.

14. The Mobile communication antenna according to claim 1, characterized by the following features:

the first metal plate arrangement comprises a plurality of separate elevations or elevation lines facing the first side of the first printed circuit board arrangement and preferably defining different chambers; and/or the second metal plate arrangement comprises a plurality of elevations or elevation lines facing the second side of the first printed circuit board arrangement and preferably defining different chambers; and/or the second metal plate arrangement comprises a plurality of elevations or elevation lines facing the second printed circuit board arrangement and preferably defining different chambers.

15. The Mobile communication antenna according to claim 14, characterized by the following features:

the plurality of elevations or elevation lines of the first metal plate arrangement are bonded to the first printed circuit board arrangement with an electrically conductive adhesive or soldered thereto; and/or the plurality of elevations or elevation lines of the second metal plate arrangement are bonded to the first printed circuit board arrangement with an electrically conductive adhesive or soldered thereto; and/or the plurality of elevations or elevation lines of the second metal plate arrangement are bonded to the second printed circuit board arrangement with an electrically conductive adhesive or soldered thereto.

16. The Mobile communication antenna according to claim 1, characterized by the following feature:

the electrical connection between the at least one dual-polarized radiator and the first printed circuit board arrangement for transmitting and receiving a mobile communication signal is free of a cable.

17. The Mobile communication antenna according to claim 1, characterized by the following feature:

a part of the first feed connection which runs through the first opening is soldered to the other part of the first feed connection which runs parallel to the first metal plate arrangement;

the part of the first feed connection which runs through the opening is enclosed by a solid dielectric material.

* * * * *